US00RE42060E

(19) United States
(12) Reissued Patent
Carnevali

(10) Patent Number: US RE42,060 E
(45) **Date of Reissued Patent: *Jan. 25, 2011**

(54) UNIVERSALLY POSITIONABLE MOUNTING DEVICE

(75) Inventor: Jeffrey D. Carnevali, Seattle, WA (US)

(73) Assignee: National Products, Inc., Seattle, WA (US)

( * ) Notice: This patent is subject to a terminal disclaimer.

(21) Appl. No.: 10/300,951

(22) Filed: Nov. 20, 2002

Related U.S. Patent Documents

Reissue of:
(64) Patent No.: 5,845,885
Issued: Dec. 8, 1998
Appl. No.: 08/803,021
Filed: Feb. 21, 1997

U.S. Applications:
(63) Continuation of application No. 09/733,691, filed on Dec. 17, 2000, which is a continuation of application No. 08/689,408, filed on Aug. 7, 1996, now abandoned, and a continuation of application No. 08/574,415, filed on Dec. 15, 1995, now abandoned, and a continuation of application No. 08/375,568, filed on Jan. 13, 1995, now abandoned, and a continuation of application No. 08/167,500, filed on Dec. 14, 1993, now abandoned.

(51) Int. Cl.
*F16M 11/02* (2006.01)

(52) U.S. Cl. ..... 248/181.1; 248/276.1; 248/288.31; 248/484

(58) Field of Classification Search ..... 248/481, 248/288.51, 181.1, 288.31, 482, 483, 484, 248/229.1, 278; 403/90, 114, 132, 143, 144, 403/122

See application file for complete search history.

(56) References Cited

U.S. PATENT DOCUMENTS

| | | | | | |
|---|---|---|---|---|---|
| 180,881 | A | | 8/1876 | Howson | |
| 538,534 | A | * | 4/1895 | Neill | 108/8 |
| 596,729 | A | | 1/1898 | White | |
| 855,149 | A | | 5/1907 | Vaughn et al. | |
| 890,656 | A | | 6/1908 | Johnson | |
| 892,105 | A | | 6/1908 | White | |
| 958,052 | A | * | 5/1910 | Williams | 248/60 |
| 1,009,913 | A | | 11/1911 | Maguire et al. | |
| 1,280,103 | A | | 9/1918 | Goddard | |

(Continued)

FOREIGN PATENT DOCUMENTS

| | | |
|---|---|---|
| SE | 497 | 11/1886 |

OTHER PUBLICATIONS

U.S. Appl. No. 10/991,325, Official Communication mailed Feb. 17, 2006.

(Continued)

*Primary Examiner*—Ramon O Ramirez
(74) *Attorney, Agent, or Firm*—Frommer Lawrence & Haug LLP; Bruce E. Black

(57) ABSTRACT

Couplers with ball-shaped heads are mounted on a pair of objects, and a split arm assembly is interposed along a line of juncture between the pair of couplers and clamped together about the heads thereof. However, before that time, a spring is interposed between the pair of elongated arm sections in the assembly to produce a differential in the reaction of the respective pairs of end portions in the arm sections to the clamping forces so that the assembly is formed into a bifurcated arm assembly at one of the heads. That one head is also compressible so that after the split arm assembly has been rotated in relation to the one head, or vice versa, to set the angle of the line of juncture with respect to one or both of the objects, further clamping of the assembly operates to interlock the assembly with the heads of the pair of couplers to rigidify the connection made by the assembly between the pair of heads.

64 Claims, 5 Drawing Sheets

U.S. PATENT DOCUMENTS

| | | | | | |
|---|---|---|---|---|---|
| 1,359,645 | A | | 11/1920 | Zink | |
| 1,455,441 | A | | 5/1923 | Hodney | |
| 1,509,068 | A | * | 9/1924 | Herron | 248/181.1 |
| 1,934,223 | A | | 11/1933 | Booth | |
| 2,114,767 | A | | 4/1938 | Hodney et al. | |
| 2,121,317 | A | | 6/1938 | Cohen | |
| 2,560,556 | A | | 7/1951 | Creedon | |
| 2,650,788 | A | | 9/1953 | Hulstein | |
| 2,710,609 | A | | 6/1955 | Giller | |
| 2,723,823 | A | | 11/1955 | Polk, Jr. | |
| 2,861,501 | A | | 11/1958 | Strelakos | |
| 3,096,061 | A | | 7/1963 | Bertell | |
| 3,843,272 | A | | 10/1974 | Jorn | |
| 4,060,241 | A | | 11/1977 | Hegel | |
| 4,060,331 | A | | 11/1977 | Domer et al. | |
| 4,066,231 | A | | 1/1978 | Bahner et al. | |
| 4,066,311 | A | | 1/1978 | Poulson | |
| 4,222,680 | A | | 9/1980 | Browing | |
| 4,225,258 | A | | 9/1980 | Thompson | |
| 4,307,864 | A | | 12/1981 | Benoit | |
| 4,461,284 | A | | 7/1984 | Fackler | |
| 4,491,435 | A | | 1/1985 | Meier | |
| 4,585,197 | A | | 4/1986 | Liautaud et al. | |
| 4,620,813 | A | | 11/1986 | Lacher | |
| 4,796,508 | A | | 1/1989 | Hoshino | |
| 4,800,795 | A | | 1/1989 | Yamashita | |
| 4,842,308 | A | | 6/1989 | Spotts | |
| 4,872,630 | A | | 10/1989 | Cooper | |
| 5,071,279 | A | | 12/1991 | Rustrom | |
| 5,092,551 | A | | 3/1992 | Meier | |
| 5,109,321 | A | * | 4/1992 | Maglica et al. | 362/191 |
| 5,118,058 | A | | 6/1992 | Richter | |
| 5,251,859 | A | | 10/1993 | Cyrell et al. | |
| 5,270,911 | A | | 12/1993 | Malica et al. | |
| 5,419,522 | A | | 5/1995 | Luecke et al. | |
| 5,441,225 | A | * | 8/1995 | Hall | 248/231.61 |
| 5,564,668 | A | | 10/1996 | Crowe, II | |
| 7,090,181 | B2 | | 8/2006 | Biba et al. | |

OTHER PUBLICATIONS

U.S. Appl. No. 10/991,325, Official Communication mailed Dec. 29, 2006.

U.S. Appl. No. 10/991,325, Official Communication mailed Apr. 27, 2007.

U.S. Appl. No. 10/991,325, Official Communication mailed Jun. 22, 2007.

U.S. Appl. No. 09/733,691, Official Communication mailed Oct. 16, 2001.

U.S. Appl. No. 09/733,691, Official Communication mailed May 20, 2002.

U.S. Appl. No. 09/733,691, Official Communication mailed Feb. 27, 2004.

U.S. Appl. No. 09/733,691, Official Communication mailed Nov. 30, 2004.

U.S. Appl. No. 09/733,691, Official Communication mailed Dec. 29, 2005.

U.S. Appl. No. 09/733,691, Official Communication mailed Jul. 31, 2007.

*National Products, Inc.* v. *Gamber–Johnson, LLC*, Civil Docket Sheet, U.S.D.C. Western District of Washington, Case No. 04–CV–02524–MJP.

First Amended Complaint, dated Apr. 7, 2005. (w/Exhibits 1–2).

Defendant Gamber–Johnson, LLC's Amended Answer and Counterclaims, dated Apr. 25, 2005.

Reply to Counterclaims, datead May 9, 2005.

Plaintiff's Amended Disclosure of Asserted Claims and Preliminary Infringement Contentions, dated Oct. 14, 2005. (w/Appendix A).

Gamber Johnson LLC's Disclosure of Preliminary Invalidity Contentions, dated Oct. 24, 2005. (w/Appendices I–II and Exhibits A–E (Exhibit D Redacted to removed Gamber–Johnson's Confidential Information).

Gamber–Johnson LLC's Prehearing Statement, dated Jan. 3, 2006. (w/Appendices I–II).

Plaintiff's Prehearing Statement, dated Jan. 3, 2006. (w/Exhibit A).

Joint Claim Chart, dated Jan. 3, 2006.

NPI's Opening Claim Construction Brief (Redacted Defendant Gamber–Johnson's Confidential Information), dated Jan. 17, 2006. (w/Appendix A).

Declaration of Robert L. Jacobson in Support of NPI's Opening Claim Construction Brief, dated Jan. 17, 2006. (w/Exhibits A–G (Redacted Defendant Gamber–Johnson's Confidential Information).

Gamber–Johnson LLC's Claim Interpretation Brief, dated Jan. 17, 2006. (w/Appendices I–IV).

Declaration of Andrew M. Ollis in Support of Gamber Johnson LLC's Claim Interpretation Brief, dated Jan. 17, 2006. (w/Exhibits A–I).

Submission of the First Amended Joint Claim Chart, dated Jan. 27, 2006.

NPI's Responsive Claim Construction Brief, dated Jan. 30, 2006.

Gamber Johnson LLC's Rebuttal Claim Interpretation Brief, dated Jan. 30, 2006.

Order on Claim Construction, dated Feb. 27, 2006.

Defendant Gamber–Johnson LLC's Second Motion for Partial Summary Judgement of Non–Infringement of Claim 30 of U.S. Pat. No. 5,845,885, dated Apr. 20, 2006.

Defendant Gamber–Johnson LLC's Third Motion for Partial Summary Judgment of Invalidity (Obviousness) of Claims 30,35 & 36 of U.S. Patent No. 5,845,885, dated Apr. 20, 2006.

Plaintiff's Oppositon to Defendant's Second Motion for Partial Summary Judgment of Non–Infringement of Claim 30 of U.S. Patent No. 5,845,885, dated May 30, 2006.

Declaration of Lee A. Swanger, PH.D., P.E., in Support of Plaintiff's Oppositon to Defendant's Second Motion for Partial Summary Judgment of Non–Infringement of Claim 30 of U.S. Patent No. 5,845,885, dated May 30, 2006.

Plaintiff's Opposition to Defendant's Third Motion for Partial Summary Judgment of Invalidity (Obviousness) of Claims 30, 35 & 36, of U.S. Patent No. 5,845,885 (Confidential Information regarding secondary considerations has been redacted), dated May 30, 2006.

Declaration of Lee A. Swanger, PH.D., P.E., in Support of Plaintiff's Opposition to Defendant's Motion for Partial Summary Judgment of Invalidity (Obviousness) of Claims 30, 35 & 36, of U.S. Patent No. 5,845,885, dated May 30, 2006.

Defendant's Fourth Motion for Partial Summary Judgment of Non–Infringement of Claims 30, 35, and 36 of U.S. Patent No. 5,845,885, dated Jun. 7, 2006.

Defendant's Reply to Plaintiff's Opposition to Defendant's Third Motion for Partial Summary Judgment of Invalidity (Obviousness) of Claims 30, 35 & 36 of U.S. Patent No. 5,845,885, dated Jun. 8, 2006.

NPI's Opposition to Gamber's Fourth Motion for Partial Summary Judgment of Non–Infringement and Cross–Motion to Exclude Untimely Non–Infringement Contentions (Redacted Defendant Gamber–Johnson's Confidential Information), dated Jun. 26, 2006.

Declaration of Lee A. Swanger, PH.D., P.E., in Support of Plaintiff's Opposition to Defendant's Fourth Motion for Partial Summary Judgment of Non–Infringement and Cross–Motion to Exclude Untimely Non–Infringement Contentions, dated Jun. 23, 2006.

Gamber–Johnson LLC's Reply to NPI's Opposition to Gamber's Fourth Motion for Partial Summary Judgment of Non–Infringement and Response to Cross–Motion to Exclude Untimely Non–Infringement Contentions, dated Jun. 30, 2006.

Amended Consent, Judgment, dated Sep. 29, 2006.

Expert Report of Lee A. Swanger, PH.D., P.E., dated Apr. 5, 2006. (w/Exhibits 1–10).

Expert Report of Robert H. Sturges, Ph.D., P.E., Concerning the Invalidity of Claims 30, 35 & 36 of U.S. Patent No. 5,845,885, dated Apr. 5, 2006. (w/Appendices I–III).

Deposition Transcript of Lee A. Swanger, dated Jun. 5, 2006.

Fish–Finder Multi–Mount, Dec. 1993.

Versa–Mount Marine Pedestal, Dec. 1993.

* cited by examiner

FIG. 4
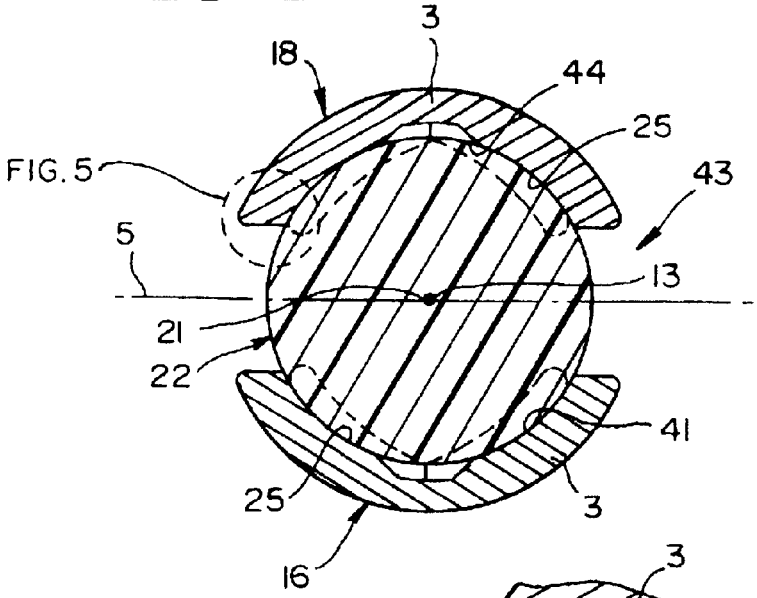
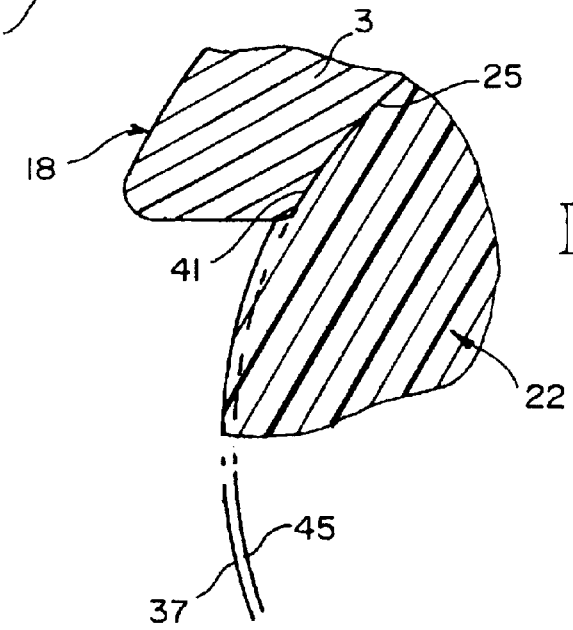
FIG. 5

UNIVERSALLY POSITIONABLE MOUNTING DEVICE

Matter enclosed in heavy brackets [ ] appears in the original patent but forms no part of this reissue specification; matter printed in italics indicates the additions made by reissue.

RELATED APPLICATIONS

*Notice: More than one reissue application has been filed for the reissue of U.S. Pat. No. 5,845,885. The reissue applications are application Ser. Nos. 09/733,691, 10/300,951 (the present application, which is a continuation of application Ser. No. 09/733,691), and application Ser. No. 10/991,325 (which is a divisional of application Ser. No. 09/733,691).*

This Application is a Continuation of application Ser. No. 08/689,408, now abandoned, filed Aug. 7, 1996 and entitled UNIVERSALLY POSITIONABLE MOUNTING ARM. application Ser. No. 08/689,408 was in turn a Continuation of application Ser. No. 08/574,415, now abandoned filed Dec. 15, 1995, and having the same title. Application Ser. No. 08/574,415 was in turn a Continuation of application Ser. No. 08/375,568, now abandoned, filed Jan. 13, 1995 and having the same title. And application Ser. No. 08/375,568 was in turn a Continuation of application Ser. No. 08/167/500, now abandoned, filed Dec. 14, 1993 and having the same title.

TECHNICAL FIELD

My invention relates to a mounting device for interposing along a line of juncture between a pair of relatively movable and relatively stationary objects, to support the relatively movable object on the relatively stationary object at a selected angular orientation of the line of juncture with respect to one of the objects. It relates in particular to a device of this nature which is universally positionable between the pair of objects, to support the relatively movable object on the relatively stationary object at variable angular orientations of the line of juncture with respect to either or both of the objects.

THE INVENTION IN GENERAL

In one combination thereof, my mounting device comprises means for forming a first coupling member on a first of the objects and a base on a second of the objects at spaced first and second loci, respectively, adjacent opposite ends of the line of juncture; and a split-arm assembly comprising a pair of elongated relatively rigid arm sections which are operatively juxtaposed to one another along the line of juncture between the spaced first and second loci of the first coupling member and the base, and have pairs of corresponding first and second end portions thereof that are operatively opposed to one another across a plane coincident with the line of juncture. The first coupling member has a body with part spherical surfaces at the outer periphery thereof that are disposed on opposite sides of the plane of the line of juncture to substantially coincide with a first circle of revolution having its center at the first locus of the first coupling member, and also having pressure deformable material therein so that the body of the first coupling member can be squeezed between the surfaces thereof to less than the diameter of the first circle of revolution. Means form a pair of operatively opposing first sockets in the pair of first end portions of the respective arm sections, and the device further comprises means for applying initial clamping forces to the pair of arm sections to squeeze the pair of arm sections together relatively crosswise the plane of the line of juncture, and means for producing a differential in the reaction of the respective pairs of first and second end portions of the arm sections to the initial clamping forces so that when squeezed together, the pair of arm sections assumes a relatively transversely contracted disposition thereof about the first coupling member and the base in which the pair of first sockets in the pair of first end portions of the pair of arm sections is operatively engaged about the outer peripheral surfaces of the first coupling member in substantial coincidence with the first circle of revolution, but the pair of second end portions of the pair of arm sections is spaced apart from one another about the base to the extent that although the pair of arm sections forms a connection between the first coupling member and the base, the connection allows the pair of arm sections to be squeezed further together about the base. When the pair of arm sections assumes the relatively transversely contracted disposition thereof about the first coupling member and the base, the pair of first sockets is adapted to form a first ball and socket joint with the outer peripheral surfaces of the first coupling member so that the first coupling member and the pair of arm sections can be pivoted in relation to one another at the first joint to position the line of juncture at a selected angular orientation with respect to the aforementioned one object. Moreover, when the pair of arm sections is in the relatively transversely contracted disposition thereof about the first coupling member and the base, the device further comprises means for applying additional clamping forces to the pair of arm sections to squeeze the pair of arm sections further together relatively crosswise the plane of the line of juncture, and means for producing a differential in the reaction of the respective pairs of first and second end portions of the pair of arm sections to the additional clamping forces so that when squeezed further together in the relatively transversely contracted disposition thereof, the pair of arm sections pivot in relation to one another about the first coupling member to reduce the space between the second end portions of the respective arm sections about the base while the pair of first sockets engages the outer peripheral surfaces of the body of the first coupling member to squeeze the body therebetween and interlock the pair of arm sections with the first coupling member to rigidify the connection between the first coupling member and the base at the selected angular orientation of the line of juncture with respect to the one object. That is to say, when the pair of arm sections is in the relatively transversely contracted disposition thereof, the device forms a ball and socket joint with the first coupling member whereby the line of juncture can be positioned at any angular orientation one chooses, and then when additional clamping forces are applied, that same first coupling member which was a part of the ball and socket joint, is given a new and additional function of aiding in the rigidifying of the connection formed by the pair of arm sections between the first coupling member and the base. Furthermore, in certain presently preferred embodiments of the invention wherein the pressure deformable material is resilient, the means for applying additional clamping forces to the pair of arm sections are releasable relatively crosswise the plane of the line of juncture to restore the first joint so that the pair of arm sections and the first coupling member can be pivoted in relation to one another to position the line of juncture at a different angular orientation with respect to the one object. That is to say, the same coupling member which was a part of the ball and socket joint, and then contributed to the rigidification of the connection between the coupling member and the base, can be restored to its initial function of participating once more in the ball and socket joint. And meanwhile, throughout it all, the assembly will remain fully intact; that is, there will be a sustainable connection throughout between the first coupling member and the base.

In many of the presently preferred embodiments of the foregoing combination, the base has attachment means thereon for forming the connection between the first coupling member and the base, and the arm sections are operatively juxtaposed about the plane of the line of juncture so that when the pair of arm sections is squeezed together by the initial clamping forces to assume the relatively transversely contracted disposition thereof, the second end portions of the pair of arm sections are reciprocated in relation to one another about the base to first positions thereof in which the pair of second end portions is mutually opposed to one another across the plane and the attachment means form a connection between the first coupling member and the base, but the pair of second end portions is sufficiently spaced apart from one another in the connection that the connection allows the pair of arm sections to be squeezed further together about the base. In some of these embodiments, the attachment means are operatively interposed between the pair of second end portions in the connection, but adapted so that the respective second end portions of the arm sections are spaced apart from the attachment means when the second end portions assume the first positions thereof in the relative reciprocation thereof, and the device further comprises means operatively interposed between the attachment means and the respective second end portions to loosely interconnect the attachment means with the pair of second end portions and vice versa when the second end portions assume the first positions thereof in the relative reciprocation thereof. In one group of embodiments, the attachment means include a second coupling member having a body with part spherical surfaces at the outer periphery thereof that are disposed on opposite sides of the plane of the line of juncture to substantially coincide with a second circle of revolution having its center at a point between the first positions of the second end portions of the arm sections in the relative reciprocation thereof, and the device further comprises means forming a pair of operatively opposing second sockets in the pair of second end portions of the respective arm sections, which engage about the outer peripheral surfaces of the second coupling member in a third circle of revolution concentric with the second circle of revolution but having a greater diameter than the second circle of revolution so that when the second end portions of the arm sections assume the first positions thereof in the relative reciprocation thereof, the body of the second coupling member and the respective second end portions of the arm sections are loosely interconnected with one another but spaced apart from one another by the differential between the diameters of the second and third circles of revolution. In certain of the group, the body of the second coupling member has pressure deformable material therein so that the body of the second coupling member can be squeezed between the surfaces thereof to less than the diameter of the second circle of revolution, and the arm sections are operatively juxtaposed about the plane of the line of juncture so that when the pair of arm sections is squeezed further together by the additional clamping forces, the second end portions of the pair of arm sections are reciprocated in relation to one another about the base to second positions thereof mutually opposed to one another across the plane of the line of juncture and in which the pair of second sockets forms a second ball and socket joint with the outer peripheral surfaces of the second coupling member, so that the second coupling member and the pair of arm sections can be pivoted in relation to one another at the second joint to also position the line of juncture at a selected angular orientation with respect to the other object if desired, and then to third positions thereof mutually opposed to one another across the plane of the line of juncture in which the pair of second sockets engages the outer peripheral surfaces of the body of the second coupling member to squeeze the body therebetween and interlock the pair of arm sections with the second coupling member to rigidify the connection between the respective first and second coupling members at the selected angular orientation of the line of juncture with respect to each of the objects. Furthermore, in some embodiments, the pressure deformable material in the bodies of the respective first and second coupling members is resilient and the means for applying additional clamping forces to the pair of arm sections are releasable relatively crosswise the plane of the line of juncture to restore the first and second joints so that the pair of arm sections can be pivoted in relation to the respective first and second coupling members and vice versa, to position the line of juncture at different angular orientations with respect to the one and/or the other objects. In one special group, the differential producing means include yieldable biasing means, and the space between the first and second loci of the first coupling member and the base, respectively, is of such length that when the second coupling member is detached from the split-arm assembly and vice versa, the pair of arm sections can be pinched together against the bias of the biasing means to separate the pair of first sockets from one another to the extent that the first coupling member can be detached from the pair of arm sections and vice versa.

In one particularly advantageous version of my device, the means for producing a differential in the reaction of the respective pairs of first and second end portions of the arm sections to the initial clamping forces include means operable to generate a lopsided effect in the application of the initial clamping forces to the respective pairs of first and second end portions of the arm sections when the pair of arm sections is squeezed together to assume the relatively transversely contracted disposition thereof. And in a related version, the base has attachment means thereon for forming the connection between the first coupling member and the base, and the attachment means and the first coupling member have means operatively interposed therebetween to generate a lopsided effect in the application of the initial clamping forces to the respective pairs of first and second end portions of the arm sections when the pair of arm sections is squeezed together to assume the relatively transversely contracted disposition thereof. In certain embodiments of this latter version, the attachment means include a second coupling member having a body with part spherical surfaces at the outer periphery thereof that are disposed on opposite sides of the plane of the line of juncture to substantially coincide with a second circle of revolution having its center at a point interposed between the second end portions of the arm sections when the pair of arm sections is squeezed together to assume the relatively transversely contracted disposition thereof. Moreover, in these embodiments of the latter version, the first and second circles of revolution have substantially equal diameters, and the means for generating a lopsided effect in the application of the initial clamping forces to the respective first and second end portions of the arm sections include yieldable biasing means disposed to oppose the application of the initial clamping forces to the second end portions of the respective arm sections. In some embodiments of this latter version, the yieldable biasing means are interposed across the plane of the line of juncture between the first and second coupling members. And in certain of them, the initial clamping forces are applied to the pair of arm sections along a line interposed across the plane of the line of juncture between the yieldable biasing means and the first coupling member. In many of them, moreover, the yieldable biasing means take the form of a coiled spring which is caged between the pair of arm sections along a line interposed across the plane of the line of juncture substantially parallel to the line of application of the initial clamping forces.

In this latter version, the arm sections may be operatively juxtaposed about the plane of the line of juncture so that when the pair of arm sections is squeezed together by the initial clamping forces, the second end portions of the pair of arm sections are reciprocated against the bias of the yieldable biasing means to positions mutually opposed to one another across the plane and in which the second coupling member forms a connection between the first coupling member and the base, but the pair of second end portions is sufficiently spaced apart from one another in the connection that the connection allows the pair of arm sections to be squeezed further together about the base. Furthermore, the space between the first and second loci of the first coupling member and the base, respectively, may be of such length that when the second coupling member is detached from the split-arm assembly and vice versa, the pair of arm sections can be pinched together against the bias of the biasing means to separate the first end portions of the arm sections from one another to the extent that the first coupling member can be detached from the pair of arm sections and vice versa.

For the purposes of many embodiments, the pressure deformable material renders the body of the first coupling member radially compressible at the outer peripheral surfaces thereof. And for many embodiments, the first sockets have surfaces at the inner peripheries thereof which are adapted to form the first ball and socket joint with the outer peripheral surfaces of the first coupling member when the pair of arm sections assumes the relatively transversely contracted dispositions thereof about the first coupling member and the base.

For many of those embodiments wherein the pressure deformable material renders the body of the first coupling member radially compressible at the outer peripheral surfaces thereof, the inner peripheral surfaces of the first sockets are part spherical and are adapted firstly, to substantially coincide with the first circle of revolution when the pair of arm sections assumes the relatively transversely contracted disposition thereof about the first coupling member and the base, so that the first joint is formed between the respective inner and outer peripheral surfaces of the first sockets and the first coupling member, and then to compress the body of the first coupling member radially thereof at the outer peripheral surfaces thereof when the pair of arm sections is squeezed further together in the relatively transversely contracted disposition thereof to interlock the pair of arm sections with the first coupling member and rigidify the connection between the first coupling member and the base at the selected angular orientation of the line of juncture with respect to the one object.

Sometimes, the respective means for applying the initial clamping forces and the additional clamping forces to the pair of arm sections include a pin and hole fastening device for fastening the pair of arm sections together relatively crosswise the plane of the line of juncture, and a clamping mechanism on the fastening device for applying clamping forces to the pair of arm sections through the fastening device.

The first coupling member may be formed of nitrile rubber material at the surface thereof.

If desired, the pair of arm sections may be adapted to extend rectilinearly between the spaced first and second loci of the first coupling member and the base.

The means forming the first coupling member and the base may be elements physically separate and distinct from the objects themselves but attachable thereto. And the split arm assembly may be physically separate and distinct from the means for forming each of the first coupling member and the base.

Also, the split arm assembly may be physically separate and distinct from the base.

In another combination thereof, the split arm assembly of the device comprises a pair of relatively rigid arm sections which have pairs of corresponding first and second end portions thereof which are operatively opposed to one another across a plane coincident with the line of juncture, so as to be disposed adjacent the first coupling member and the base, respectively. Clamping means are operable to squeeze the pair of arm sections together relatively crosswise the plane of the line of juncture, and the device further comprises means for producing a differential in the reaction of the respective pairs of first and second end portions of the arm sections to the squeezing action of the clamping means, so that when squeezed together, the pair of arm sections forms a bifurcated arm assembly that in a first position thereof, has its apex at the first locus of the first coupling member and is loosely engaged about the base at the second end portions thereof. Means form a pair of operatively opposing first sockets in the first end portions of the respective arm sections, having substantially smooth part spherical surfaces at the inner peripheries thereof which substantially coincide with a circle of revolution which has its center at the first locus of the first coupling member when the bifurcated arm assembly is engaged in the first position thereof about the first coupling member. Meanwhile, the first coupling member has a substantially smooth part spherical surface thereon which forms the outer periphery thereof and substantially coincides with the circle of revolution, so that the pair of first sockets and the first coupling member form a relatively rotatable ball and socket joint in the first position of the bifurcated arm assembly. However, the clamping means are operable in the first position of the bifurcated arm assembly to squeeze the pair of arm sections further together relatively crosswise the plane of the line of juncture and to a second position of the bifurcated arm assembly in which the inner peripheral surfaces of the first sockets assume a disposition relatively radially within the circle of revolution, and the first coupling member is sufficiently radially compressible at the outer peripheral surface thereof that between the first and second positions of the bifurcated arm assembly, the inner peripheral surfaces of the first sockets can deform the surface of the first coupling member to interlock the bifurcated arm assembly with the first coupling member and vice versa, at a selected angular orientation of the line of juncture with respect to the one object. Moreover, means are operable to produce a differential in the reaction of the respective pairs of first and second end portions of the arm sections to the further squeezing action of the clamping means so that when squeezed further together into the second position of the bifurcated arm assembly, the pair of arm sections pivots relatively toward one another about the first coupling member to seize the base and rigidly interconnect the bifurcated arm assembly with the base at the selected angular orientation of the line of juncture with respect to the one object. Furthermore, in this additional combination, the clamping means may be releasable, and when the clamping means are released, the pair of arm sections may be reciprocable in relation to one another to a third position of the bifurcated arm assembly in which the pair of arm sections is sufficiently spaced apart about the first locus of the first coupling member that the first coupling member is detachable from the bifurcated arm assembly and vice versa.

At times, the base in this further combination takes the form of a second coupling member which has a substantially smooth part spherical outer peripheral surface thereon, and is also compressible radially thereof at the outer peripheral surface thereof, and the mounting device further comprises means forming a pair of operatively opposing second sockets in the second end portions of the pair of arm sections which have substantially smooth part spherical surfaces at the inner peripheries thereof that are rotatably engageable with the second coupling member at the outer peripheral surface thereof in the respective positions of the bifurcated arm assembly lying between the third and first positions thereof inclusive, and which progressively seize the second coupling member by compressing and deforming the outer peripheral surface thereof to interlock the bifurcated arm assembly with the second coupling member when the pair of arm sections is squeezed together in the direction of the second position of the bifurcated arm assembly from the first position thereof.

Often, the base and the arm sections in this further combination are adapted for rotation of the bifurcated arm assembly about the base and vice versa at the second locus of the base.

In still another combination thereof, my mounting device comprises means for forming a first coupling member on a first of the objects and a base on a second of the objects at spaced first and second loci, respectively, adjacent opposite ends of the line of juncture, and a split arm assembly comprising a pair of relatively rigid arm sections which are adapted to be operatively juxtaposed to one another along the line of juncture between the spaced first and second loci of the first coupling member and the base, and have faces thereon which are operatively opposed to one another across a plane coincident with the line of juncture. Releasable clamping means are operable to reciprocate the pair of arm sections in relation to one another relatively crosswise the plane of the line of juncture to form the split arm assembly into a bifurcated arm assembly which has its apex at the second locus of the base and is engaged about the first coupling member. Means form a pair of operatively opposing first sockets in the faces of the respective arm sections, having substantially smooth part spherical surfaces at the inner peripheries thereof which substantially coincide with a circle of revolution that has its center at the first locus of the first coupling member when the bifurcated arm assembly is engaged in a first position thereof about the first coupling member. Meanwhile, the first coupling member has a substantially smooth part spherical surface thereon which forms the outer periphery thereof and substantially coincides with the circle of revolution, so that the pair of first sockets and the first coupling member form a relatively rotatable ball and socket joint in the first position of the bifurcated arm assembly. However, the clamping means are operable in the first position of the bifurcated arm assembly to reciprocate the pair of arm sections in relation to one another to a second position of the bifurcated arm assembly in which the first sockets assume a disposition relatively radially within the circle of revolution, and the first coupling member is sufficiently radially compressible at the outer peripheral surface thereof that between the first and second positions of the bifurcated arm assembly, the inner peripheral surfaces of the pair of first sockets can deform the surface of the first coupling member to interlock the bifurcated arm assembly with the first coupling member and vice versa. But, the inner peripheral surfaces of the first sockets are also substantially smooth over sufficient arcuate extent circumferentially of the outer peripheral surface of the first coupling member, and the first coupling member is sufficiently resilient about the surface thereof, that when the clamping means are released, the pair of first sockets and the first coupling member reform a relatively rotatable ball and socket joint at the first position of the bifurcated arm assembly, so that the bifurcated arm assembly can be rotated about the first coupling member to vary the angular orientation of the line of juncture with respect to the first coupling member.

When the clamping means are released in certain embodiments of this still further combination, the pair of arm sections are reciprocable in relation to one another to a third position of the bifurcated arm assembly in which the faces of the pair of arm sections are sufficiently spaced apart about the first locus of the first coupling member that the first coupling member is detachable from the bifurcated arm assembly and vice versa. Moreover, in some of these embodiments, the base takes the form of a second coupling member which has a substantially smooth part spherical surface thereon that forms the outer periphery thereof, and which is also compressible radially thereof at the outer peripheral surface thereof, and the mounting device further comprises means forming a pair of operatively opposing second sockets in the faces of the respective arm sections which have substantially smooth part spherical surfaces at the inner peripheries thereof that are rotatably engageable with the second coupling member at the outer peripheral surface thereof in the respective positions of the bifurcated arm assembly lying between the third and first positions thereof inclusive, and which progressively seize the second coupling member by compressing and deforming the surface thereof to interlock the bifurcated arm assembly with the second coupling member when the pair of arm sections is reciprocated in relation to one another in the direction of the second position of the bifurcated arm assembly from the first position thereof.

The releasable clamping means in these latter embodiments may include yieldable biasing means operable to space the pair of arm sections from one another at the faces thereof relatively crosswise the plane of the line of juncture, and a releasable clamping mechanism operable against the bias of the yieldable biasing means to reciprocate the pair of arm sections relatively toward one another at the faces of the arm sections, the yieldable biasing means and the clamping mechanism being engaged with the pair of arm sections in the space between the first and second loci of the first coupling member and the base, respectively, to form the split arm assembly into a bifurcated arm assembly which has its apex at the second locus of the base when the pair of arm sections is reciprocated relatively toward one another at the faces thereof. Furthermore, in certain embodiments, the faces of the respective arm sections may have recesses therein between the first and second loci of the first coupling member and the base, and the yieldable biasing means may take the form of a coiled spring which is caged between the respective arm sections at the recesses in the faces thereof.

Sometimes, the space between the first and second loci of the first and second coupling member is of such length that when the first coupling member is detached from the bifurcated arm assembly and vice versa, the arm sections can be pinched together against the bias of the spring to separate the pair of second sockets from one another to the extent that the second coupling member can be detached from the pair of arm sections and vice versa.

At times, moreover, the arm sections may have a pair of mutually opposing openings therein at the bottoms of the recesses, and the clamping mechanism may take the form of an elongated bolt which is passed through the pair of openings and has a flange on one end portion thereof and threading on the other end portion thereof, and a knob which is threadedly engaged with the threading on the other end portion of the bolt and cooperable with the flange on the bolt to clamp the pair of arm sections therebetween.

In a still further combination thereof, the first coupling member of the device has a reduced diameter neck at a side thereof opposed to the part spherical surface thereof, and the first sockets have rims formed thereabout at the faces of the respective arm sections, and indentations in the respective rims thereof at the plane of the line of juncture, which together are greater in width than the neck so that the bifurcated arm assembly can be rotated about the first locus of the first coupling member to angular orientations in which the line of juncture extends at right angles to the neck of the first coupling member. Where the respective arm sections have ends adjacent the first sockets, the first sockets may also have indentations in the respective rims thereof at the adjacent ends of the arm sections, which together are greater in width than the neck so the bifurcated arm assembly can be rotated about the first locus of the first coupling member to angular orientations in which the plane of the line of juncture extends at oblique angles to the first coupling member.

In yet another combination, the first sockets have rims formed thereabout at the faces of the respective arm sections and the first sockets have cruciate grooves at the inner peripheries thereof subdividing the part spherical surfaces thereof into four relatively smaller part spherical surfaces apiece, each of which terminates at the groove in the respective first socket and the rim thereabout.

BRIEF DESCRIPTION OF THE DRAWINGS

These features will be better understood by reference to the accompanying drawings wherein I have illustrated a presently preferred embodiment of my mounting device wherein the split arm assembly is interposed between a pair of couplers on a medical monitor and a relatively stationary surface therebelow, and clamped about a pair of ball-shaped coupling heads on the couplers to support the monitor on the surface at various angular orientations thereto.

In the Drawings:

FIG. 4 is a cross sectional view along the line 4—4 of FIG. 1 when the split arm assembly of the device has been clamped about the heads of the couplers to form a ball and socket joint at the head of one of the couplers, but not squeezed about the heads to the extent that the connection formed between the heads by the device is rigidified;

FIG. 5 is a part cross sectional view along the line 5—5 of FIG. 4 illustrating the effect on the ball and socket joint formed about the head of the one coupler when the split arm assembly has been squeezed further together about the heads of the respective couplers to rigidify the connection therebetween;

BEST MODE FOR CARRYING OUT THE INVENTION

Figure 1:
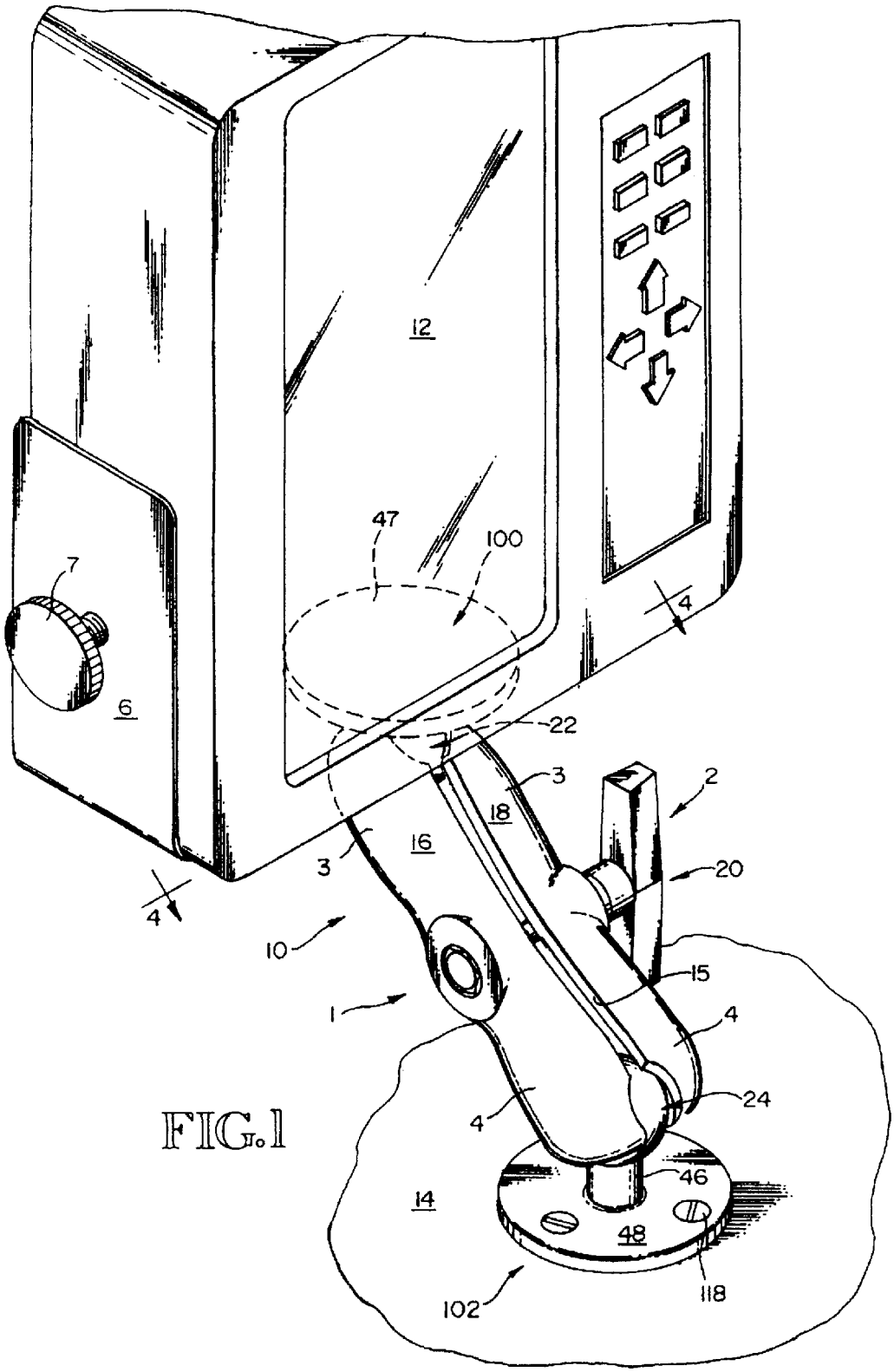
FIG. 1 is a perspective view of the monitor, surface and mounting device when the split arm assembly has been clamped about the heads of the couplers to form a connection therebetween and then clamped about them further to rigidify the connection and thereby support the monitor on the surface.
Figure 2:
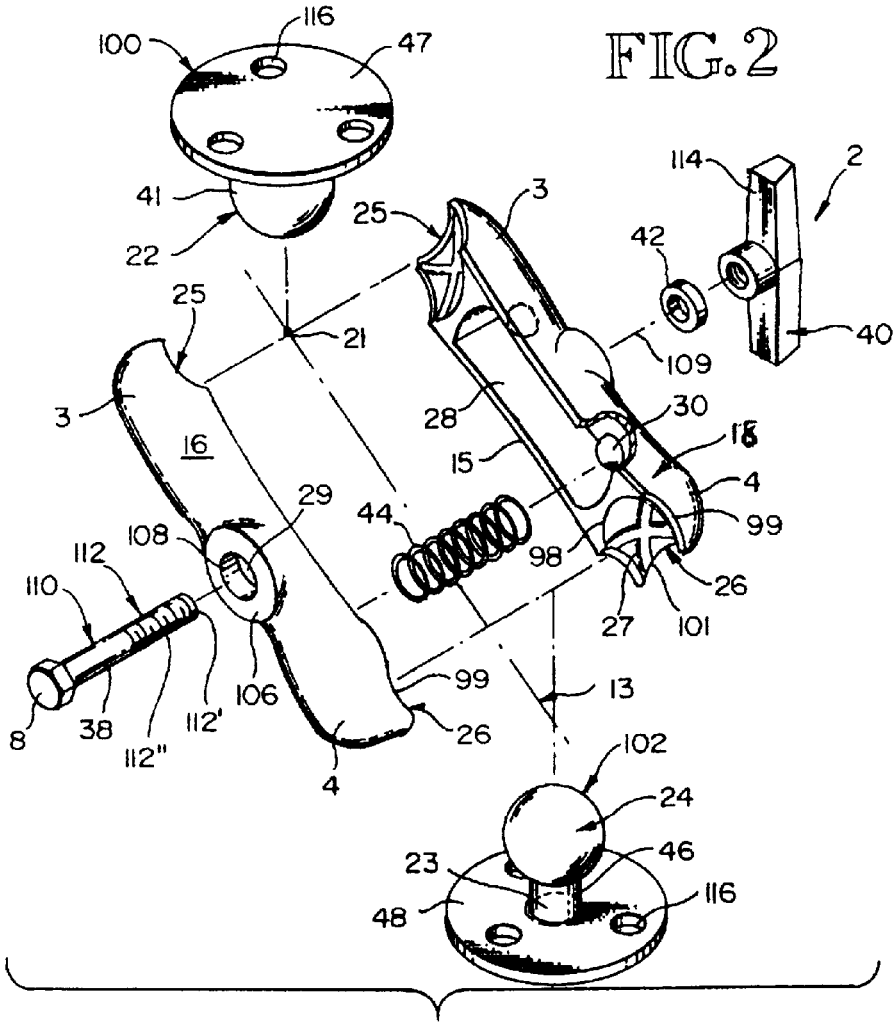
FIG. 2 is a perspective view of the mounting device alone after it has been exploded into the respective components thereof to aid in understanding the combination of them.

Referring initially to FIGS. 1–5, it will be seen that the medical monitor 12 is supported in an upright U-shaped bracket 6 secured to the same by a fastener 7, and the bracket and monitor are supported in turn on a mounting device 10 of my invention which is mounted upright in turn on a relatively stationary surface 14 therebelow. The mounting device 10 comprises a split arm assembly 1, a device 20 with which to fasten together the pair of elongated, relatively rigid arm sections 16 and 18 in the assembly, a coiled spring 44 (FIG. 2) with which to separate the pair of arm sections when they are fastened together, a clamping mechanism 2 with which to squeeze together the pair of arm sections against the yieldable bias of the spring, and a pair of couplers 100 and 102 with part spherical heads 22 and 24 thereon, respectively, to which the split arm assembly 1 is clamped by the clamping mechanism 2 when the device 10 is put in use in mounting the bracket 6 and monitor 12 on the surface 14. The respective arm sections 16 and 18 are identical, and are arranged in the mounting device 10 so as to be operatively juxtaposed to one another along a line of juncture 13 (FIG. 2) extending therebetween. In that disposition, the respective arm sections have faces 15 thereon which are operatively opposed to one another across a plane 5 (FIG. 4) coincident with the line of juncture 13; and also pairs of corresponding first and second end portions 3 and 4 thereof that are operatively opposed to one another across the same plane. There are pairs of recesses in the faces of the respective arm sections, forming pairs of operatively opposing first and second sockets 25 and 26 in the pairs of first and second end portions 3 and 4 of the arm sections, respectively; and the respective pairs of sockets 25 and 26 have part spherical surfaces at the inner peripheries thereof, and rims 98 formed thereabout on the faces 15 of the respective arm sections. The respective rims 98 have indentations 99 formed therein at the plane 5 of the line of juncture, and additional indentations 101 formed therein at the adjacent ends of the arm sections. Moreover, the respective pairs of sockets have cruciate grooves 27 formed therein at the inner peripheries thereof, and the respective grooves subdivide the part spherical surfaces of the respective sockets into four relatively smaller part spherical surfaces apiece, each of which terminates at the groove 27 in the respective socket and at the rim 98 formed thereabout.

At the midsections of the arm sections 16 and 18, the faces 15 of the respective arm sections have reduced diameter waists 103 (FIG. 3), and additional recesses 28 (FIG. 3) formed therein, which are elongated lengthwise of the respective arm sections, and are relieved still deeper at the opposite ends thereof to form pairs of sumps 32 (FIG. 3) in the end portions of the respective arm sections, which have rounded bosses 30 upstanding therein. Between the pairs of sumps, the recesses 28 also have part circular lands 104 formed on the bottoms thereof, which in turn have cylindrical openings 29 therein. At their outsides, the openings 29 are surrounded by circular lands 106 (FIG. 2) having counterbores 108 therein at the months of the openings 29. When the pair of arm sections 16 and 18 is operatively juxtaposed to one another to form the split arm assembly 1, the openings 29 are disposed to assume a substantially coaxial relationship with one another and the spring 44 is interposed between the pair of opposing sumps 32 in the end portions 4 of the arm sections, and circumposed about the bosses 30 on the pair of sumps, so as to be caged lengthwise between the pair of end portions 4 when the pair of arm sections is squeezed together by the damping mechanism 2. In that disposition, the spring yieldably bias the pair of arm sections to relatively separate from one another when the clamping mechanism is relaxed, but is compressed between the pair of arm sections when the arm sections are squeezed together by the clamping mechanism.

Meanwhile, the fastening device 20 is interconnected between the pair of arm sections along the axis 109 of the openings 29, where it can also be subjected to compression by the clamping mechanism 2. The fastening device 20 comprises an elongated bolt 110 with a hexagonal head 8 at one end of the elongated shank 38 thereof, and threading on the opposing end portion 112 of the shank. It also comprises an internally threaded knob 40 with diametrically opposing wings 114 thereon, and a washer 42 that is to be sleeved about the shank 38 of the bolt ahead of the knob 40. The internal threading of the knob 40 is sized to threadedly engage with the threaded end portion 112 of the shank, and the pair of arm sections 16 and 18 is fastened together by passing the shank of the bolt 110, first, through the opening 29 in the arm section 16 and then through the opening 29 in the arm section 18, then sleeving the washer 42 about the projecting threaded end portion 112 of the shank of the bolt, and then threadedly engaging the knob 40 on the threaded end portion 112 of the shank of the bolt while the head 8 of the bolt is engaged in the counterbore 108 of the opening 29 in the arm section 16.

In the arrangement, the knob 40 and the bolt 110 also function as the clamping mechanism 2, in that the pair of arm sections can be squeezed together along the longitudinal axis 109 of the bolt 110, and against the bias of the spring 44, by threading the knob 40 relatively inwardly along the length of the threaded end portion 112 of the shank of the bolt in the direction of the head 8 thereof. Alternatively, the pair of arm sections can be allowed to retract from one another by unthreading the knob 40 along the shank 38 of the bolt in the opposite direction, to allow the bias of the spring 44 to separate the pair of arm sections from one another. Meanwhile, in both cases, because of the eccentricity of the spring 44 with respect to the axis 109 of the bolt 110, there is a differential in the reaction of the respective pairs of first and second end portions 3 and 4 of the arm sections to the clamping forces generated by the clamping mechanism 2, and this differential has a major role in the operation of the mounting device 10, as shall be explained.

The couplers 100 and 102 are identical and each comprise a disc-shaped base 47 and 48, respectively, with a reduced diameter neck 46 relatively upstanding thereon, and a ball shaped head 22 and 24, respectively, upstanding in turn on the neck. The head has part spherical surfaces 41 (FIG. 5) about the outer periphery thereof, and a pressure deformable elastomeric material in the body thereof, which renders the head relatively radially compressible between the respective part spherical surfaces 41 thereof. The material is also relatively resilient, however, so that when the compressive forces are released, the body of the head will resume its original ball shaped configuration at the surfaces 41 thereof. The respective heads 22, 24 are sized so that the radii thereof are approximately equal to those of the inner peripheral surfaces of the sockets 25 and 26, and in the operation of the device 10, the sockets 25 in the end portions 3 of the arm sections 16, 18, are engaged about the head 22 of the coupler 100 so as to form a ball and socket joint 43 (FIG. 4) therebetween. That is, the inner peripheral surfaces of the sockets 25 and the part spherical surfaces 41 of the head 22 are caused to substantially coincide with a first circle of revolution 37 (FIG. 5) having its center at the first locus 21 of the head. Later in the operation of the device, the inner peripheral surfaces of the sockets 26 in the end portions 4 of the arm sections 16, 18 are caused to engage about the surfaces 41 of the head 24 of the coupler 102 to form a similar joint therebetween, but only that between the head 22 and the sockets 25 is shown in the drawings. In each case, the pressure deformable material in the body of the head enables the head to be squeezed between the surfaces 41 thereof to less than the diameter of the circle of revolution 37 with which the respective surfaces of the sockets and the head coincide. Moreover, the resiliency of the material in the body of the head enables the surfaces 41 thereof to resume coincidence with that circle when the compression on the head is released in a subsequent stage in the operation of the device.

The base of each coupler has openings 116 therein for screws 118 with which the coupler is fastened to an object to be coupled. In FIG. 1, for example, the coupler 100 is fastened in this manner to the underside of the bracket 6, whereas the coupler 102 is fastened in like manner to the mounting surface 14.

When the mounting device 10 is put to use, there are two principal stages in the operation of it, a first stage in which the split arm assembly and the clamping mechanism are employed to make a loose connection between the pair of objects 6 and 14, and a second stage in which that connection is rigidified so as to support one object 6 on the other 14. Meanwhile, between the two stages, there is an intermediate stage in which the angular orientation of the line of juncture 13 between the pair of arm sections 16 and 18 can be varied with respect to either or both of the objects, so as to vary the angular orientation of one object, 6, with respect to the other 14. This is true whether the device 10 has been pat through the first stage in the operation thereof, but not the second, or has been put through both stages of its operation, and then the second or rigidification stage has been reversed, so as to derigidify the connection and enable the angular orientation of the line of juncture 13 to be varied once again. It is also true that whether the adjustment is made before the rigidification stage, or at the end of the derigidification stage, the device 10 will persist in maintaining a connection between the pair of objects while the adjustment is made. The connection can be made to have sufficient rigidity at one end thereof, 3, 100, 3, moreover, that the adjustment can be made at the other end thereof, 4, 102, 4 while the rigidity of the one end 3, 100, 3 is relied on to maintain the angular orientation of the line of juncture 13 with respect to the object 6 at the one end of the connection.

In carrying out the two stages of operation, two different portions 112' and 112" of the threading 112 on the shank 38 of the bolt 110 are employed in applying the clamping forces to the pair of arm sections. Moreover, in carrying out the two stages, the end portions 3 and 4 of the pair of arm sections undergo two different phases in the reaction thereof to the clamping forces. Both effects will become apparent in the explanation of the operation of the device 10 which follows.

To carry out the operation, initially, the two couplers 100 and 102 are secured to the pair of objects 4 and 14, respectively, to form a first coupling member 22 on a first, 6, of the objects, and a base 48 on the second, 14, of the objects. The couplers and objects are also arranged so that the first coupling member 22 and the base 48 are spaced apart from one another at first and second loci 21 and 23, respectively, adjacent the opposite ends of a line of juncture 13 along which the mounting device 10 is to be interposed between the pair of objects. This leaves part spherical surfaces 41 of the first coupling member 22 disposed on opposite sides of a plane 5 (FIG. 4) of the line of juncture, and substantially in coincidence with a first circle of revolution 37 (FIG. 5) having its center at the first locus 21 of the first coupling member 22. Either simultaneously with or subsequent to securing the couplers to the pair of objects, the split arm assembly 1 is arranged about the line of juncture 13 so that the pair of arm sections 16 and 18 is operatively juxtaposed to one another along the line between the spaced first and second loci 21 and 23 of the first coupling member and the base, and the pairs of corresponding first and second end portions 3 and 4 of the arm sections are operatively opposed to one another across the aforementioned plane 5 of the line of juncture. The faces 15 of the arm sections are likewise operatively opposed to one another across the plane 5 of the line of juncture. Meanwhile, the spring 44 and the fastening device 20 are engaged between the split arm assembly 1 so as to hold the pair of arm sections together, and the knob 40 is threaded onto the tip end portion 112' of the threaded end portion 112 of the shank of the bolt and rotated sufficiently inwardly about the threading on the tip end portion 112' to apply initial clamping forces to the pair of arm sections and thereby squeeze the pair of arm sections together relatively crosswise the plane 5 of the line of juncture. As the pair of arm sections is squeezed together, however, the spring 44 produces a differential in the reaction of the respective pairs of first and second end portions 3 and 4 of the arm sections, so that the pair of arm sections assumes a relatively transversely contracted disposition thereof about the first coupling member 22 and the base 48 in which the pair of first sockets 25 in the pair of first end portions 3 of the arm sections is operatively engaged about the peripheral surfaces 41 of the first coupling member 22 in substantial coincidence with the first circle of revolution 37, but the pair of second end portions 4 of the arm sections is spaced apart from one another about the base 48 to the extent that although the pair of arm sections forms a connection between the first coupling member and the base, at the second coupling member or attachment means provided by the head 24, the connection allows the pair of arm sections to be squeezed further together about the base 48. This completes the first stage in the operation of the device and inasmuch as at the conclusion of it, the pair of first sockets 25 forms a first ball and socket joint 43 (FIG. 4) with the outer peripheral surfaces 41 of the first coupling member 22, the first coupling member and the pair of arm sections can be pivoted in relation to one another at the first joint 43 to position the line of juncture 13 at any angular orientation desired with respect to either or both of the objects 6, 14. Meanwhile, the first coupling member and the base will remain connected by the device. However, because of the differential in the reaction of the pairs of end portions 3 and 4 of the arm sections, the connection can be made tighter at the end thereof comprising the head 22, and an adjustment can be made more readily at the end of the connection comprising the second coupling member or head 24. An adjustment can be made at either end, however, and while it is being made, the connection will continue to remain intact, so that only limited assistance from un operator is needed support one object on the other during this intermediate stage.

When an angular orientation for the line of juncture 13 has been selected, the device 10 can be put through the second stage in the operation thereof to rigidify the connection between the pair of objects. In this instance, the knob 40 is rotated about the next successive longitudinal portion 112" of the threading on the shank 38 of the bolt 110 to apply additional clamping forces to the pair of arm sections, and to apply those forces to the extent necessary to rigidify the connection between the first coupling member 22 and the base 48 at the selected angular orientation of the line of juncture 13 with respect to the pair of objects 6, 14. During the first stage in the operation of the device, the end portions 3, 4 of the pair of arm sections underwent a "free-swinging" first phase in the reaction thereof to the clamping forces because the compressed length of the spring 44 remained greater than the diameters of the heads 22 and 24. During the second stage in the operation of the device, the end portions 3, 4 will continue to undergo a "free-swirling" phase, but only so long as the compressed length of the spring is greater than the diameter of the heads 22 and 24. When the compressed length of the spring is equal to the diameter of the heads, that is, when the clamping mechanism 2 has completely overcome the relatively transversely outwardly directed forces of the spring, then the end portions 3, 4 will enter a second phase in the reaction thereof to the clamping forces of the mechanism 2, and this second phase is possible only because the first coupling member 22 is not hard and incompressible. This is to say, were the first coupling member hard and incompressible, the clamping mechanism would no longer be able to leverage the arm sections 16, 18 into engagement with the head 24 of the coupler 102, because of the equilibrium established between the heads and the spring. Likewise, the spring would no longer be able to produce a differential in the reaction of the end portions 3, 4 to the clamping forces of the mechanism 2. In short, the mechanism would be rendered ineffective to produce any further useful result, other than perhaps to increase the friction between the pair of sockets 25 and the first coupling member 22. But that is not the case with the present mounting device 10. To the contrary, when the compressed length of the spring is equal to the diameter of the heads 22, 24, the compressibility of the head 22 enables the clamping mechanism 2 to continue leveraging the arm sections 16, 18 into engagement with the head 24 of the coupler 102, and the spring in turn to continue producing a differential in the reaction of the end portions 3, 4 of the arm sections to the clamping forces of the mechanism. Moreover, the body of the first coupling member 22 also has resiliency in the material thereof, so that with each increment of reduced diameter in the body of the member, a greater proportion of the clamping forces is applied to the end portions 4 of the arm sections to produce a pliers-like grip on the head 24 of the coupler 102 at the sockets 26. That is, the bifurcated arm assembly formed by the clamping mechanism 2 from the split arm assembly 1, and having its apex at the locus 21 of the first coupling member 22, is reciprocated from the "first" position thereof in which a ball and socket joint 43 was formed between the first coupling member 22 and the sockets 25, to a "second" position thereof in which the head 24 of the coupler 102 is sufficiently compressed to interlock the bifurcated arm assembly with the head and vice versa. Meanwhile, even as the pair of arm sections is pivoting about the first coupling member 22 to reduce the space between the end portions 4 of the arm sections about the base 48 of the coupler 102, the pair of sockets 25 is engaging the surfaces 41 on the body of the first coupling member to squeeze the body of the first coupling member therebetween and interlock the pair of arm sections with the first coupling member to rigidify the connection between the first coupling member and the base 48 of the coupler 102 at the selected angular orientation of the line of juncture 13 with respect to the pair of objects 6, 14. See FIG. 5 wherein the inner peripheral surfaces of the pair of first sockets 25 are embedded in the surfaces 41 of the first coupling member to a second circle of revolution 45 having its center at the locus 21 of the first coupling member but smaller in diameter than the first circle of revolution 37.

Furthermore, because of the inherent resiliency in the body of the first coupling member 22, the first joint 43 can be restored if desired, to enable a further adjustment to be made in the orientation of the line of juncture, by releasing the clamping mechanism 2 relatively crosswise the plane 5 of the line of juncture until the pair of arm sections and the first coupling member can be pivoted in relation to one another to a new location at which the line of juncture is repositioned at a different angular orientation with respect to the pair of objects 6, 14.

Alternatively, while the clamping mechanism is being released, the pair of arm sections can be retracted in relation to one another to a "third" position of the bifurcated arm assembly in which the faces 15 of the pair of arm sections are sufficiently spaced apart from one another about the head 24 of the coupler 102, that the head 24 is detachable from the bifurcated arm assembly and vice versa. In addition, the space between the first and second loci 21, 23 of the pair of couplers 100, 102 may be of such length, due to the length of the split arm assembly itself, that when the head 24 is detached from the bifurcated arm assembly and vice versa, the end portions 4 of the arm sections can be pinched together against the bias of the spring 44 to separate the pair of sockets 25 from one another to the extent that the first coupling member 22 can also be detached from the pair of arm sections and vice versa.

When operatively opposed to one another, the indentations 99 formed in the rims 98 of the sockets 25, 26 form slots therebetween that are greater in width than the necks 46 of the couplers, so that the angular orientation of the line of juncture 13 can be made to extend at right angles to the neck of either coupler, if desired, for example, by rotating the bifurcated arm assembly about the head of that coupler until the neck of the coupler engages in the slot formed by the indentations. Similarly, the indentations 101 formed in the rims 98 of the sockets at the ends of the arm sections form "fish mouths" therebetween that are sufficiently wider than the necks of the couplers, that the bifurcated arm assembly can be rotated about a head, for example, the head 22 of the coupler 100, to an angular orientation in which the plane 5 of the line of juncture 13 extends at an oblique angle to the bead.

The indentations 99 and 101 and the cruciate grooves 27 in the sockets 25, 26 also provide recesses into which the bodies of the respective heads 22, 24 can deform when they are subjected to compression by the pairs of sockets 25, 26 corresponding thereto.

Commonly the respective heads 22, 24 are formed of nitrile rubber material at the surfaces 41 thereof. Other materials, including other hardened rubber and elastomer materials, may be employed. The materials are commonly given a Shore A durometer of between about 30–100 and preferably between about 60–100. Most preferable is a Shore A durometer of about between 85–90. In some versions, the heads have a Shore D hardness of between 40 and 70.

While supporting one object on another, the mounting device 10 will also operate to damp the transmission of mechanical vibrations from one object to the other, and in fact to function as a shock absorber between the two. Furthermore, the heads 22, 24 will act as electrically insulative media in the combination, so that any stray current on one object will not travel to the other.

When the clamping mechanism 2 has been released sufficiently to detach the split arm assembly from the coupler 102 and vice versa, the remainder 100, 1 of the device 10 can be moved in conjunction with the object 6 to a new location, and attached to a different coupler 102 at that location. Alternatively, the device 10 can be detached from both objects 6, 14, and moved from one location to another separate from both objects, if desired.

Figure 7:
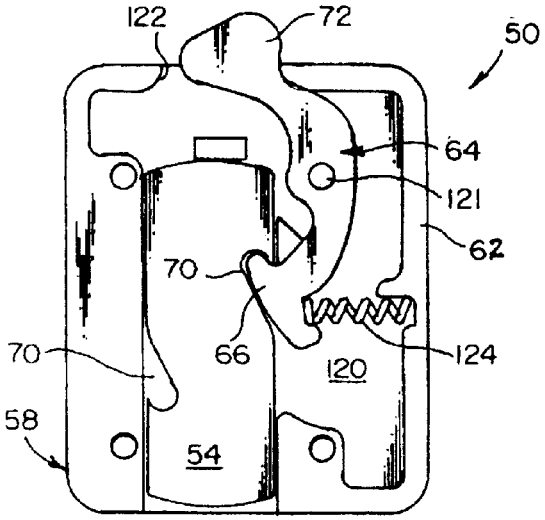
FIG. 7 is a plan view of the shoe at the bottom thereof, when the alternative form of coupler has been inserted in the hollow of the shoe and the bottom of the shoe itself has been removed to show how the coupler engages therein.
Figure 6:
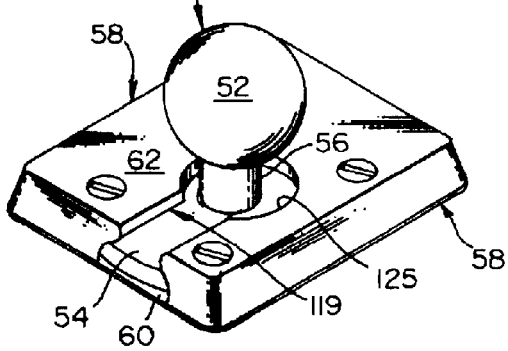
FIG. 6 is a perspective view of an alternative form of coupler which is mountable on an object to be coupled by inserting it in a hollow shoe secured to the object in question.
Figure 3:
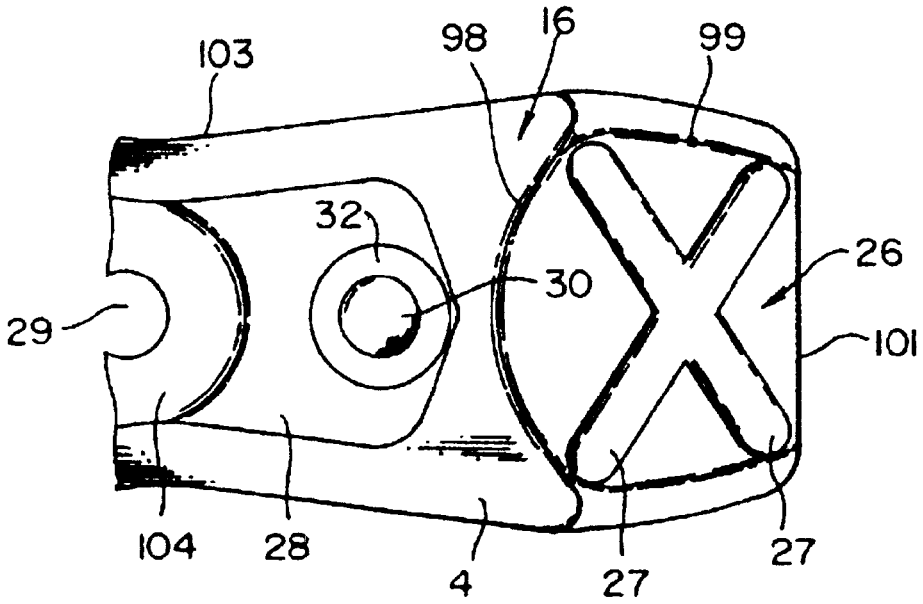
FIG. 3 is a plan view of the relatively inside face of one end portion of one arm section split arm assembly in the device.

An alternative coupler 50 is seen in FIGS. 6 and 7. The alternative coupler 50 has a base 54, a neck 56 upstanding on the base, and a resiliently compressible head 52 on the neck, as in the embodiment of FIGS. 1–5. But the base 54 takes the form of a generally rectangularly shaped plate which is slidably insertable in a hollow shoe 58 for the base having a keyhole-shaped slot 119 in the top 62 thereof. The shoe has a rectangular bottom 60 that is securable to an object, and a similarly shaped top 62 thereon forming a shallow hollow 120 therebetween, which opens to the exterior of the shoe through the slot 119. The top of the shoe also has a pin 121 depending therefrom in the hollow of the shoe, and about which a latch 64 is pivotally mounted. The latch 64 has an arm 72 on one end thereof, which projects through a slot 122 in one side of the top of the shoe, and a hook 66 on the opposite end thereof which is engageable in a recess 70 in one side of the plate-like base 54 of the coupler 50. A spring 124 biases the hook 66 of the latch 64 into engagement with that side of the base 54 of the coupler when the base is inserted in the hollow 120 of the shoe 58 at the slot 119 thereof. When the neck 56 and head 52 of the coupler are upstanding in the center opening 125 of the slot 119, the hook 66 engages in the recess 70 to retain the coupler 50 in the shoe until the lever 72 is actuated to disengage the hook 66 from the recess 70 and enable the coupler to be removed from the shoe. When desired, a number of such shoes 58 can be secured to a workbench, ceiling, wall or the like, at various locations thereon, so that a mounting device 10 can be employed at any one of the locations and then shifted to another location when desired. Alternatively, a plurality of couplers 50 can be secured to an equal number of lights, instruments, sensors or the like, and then a selected light, instrument or sensor can be coupled to a mounting device 10 at a particular site, by inserting the base 54 of the coupler secured to the same, into a shoe 58 at that site.

Figure 8:
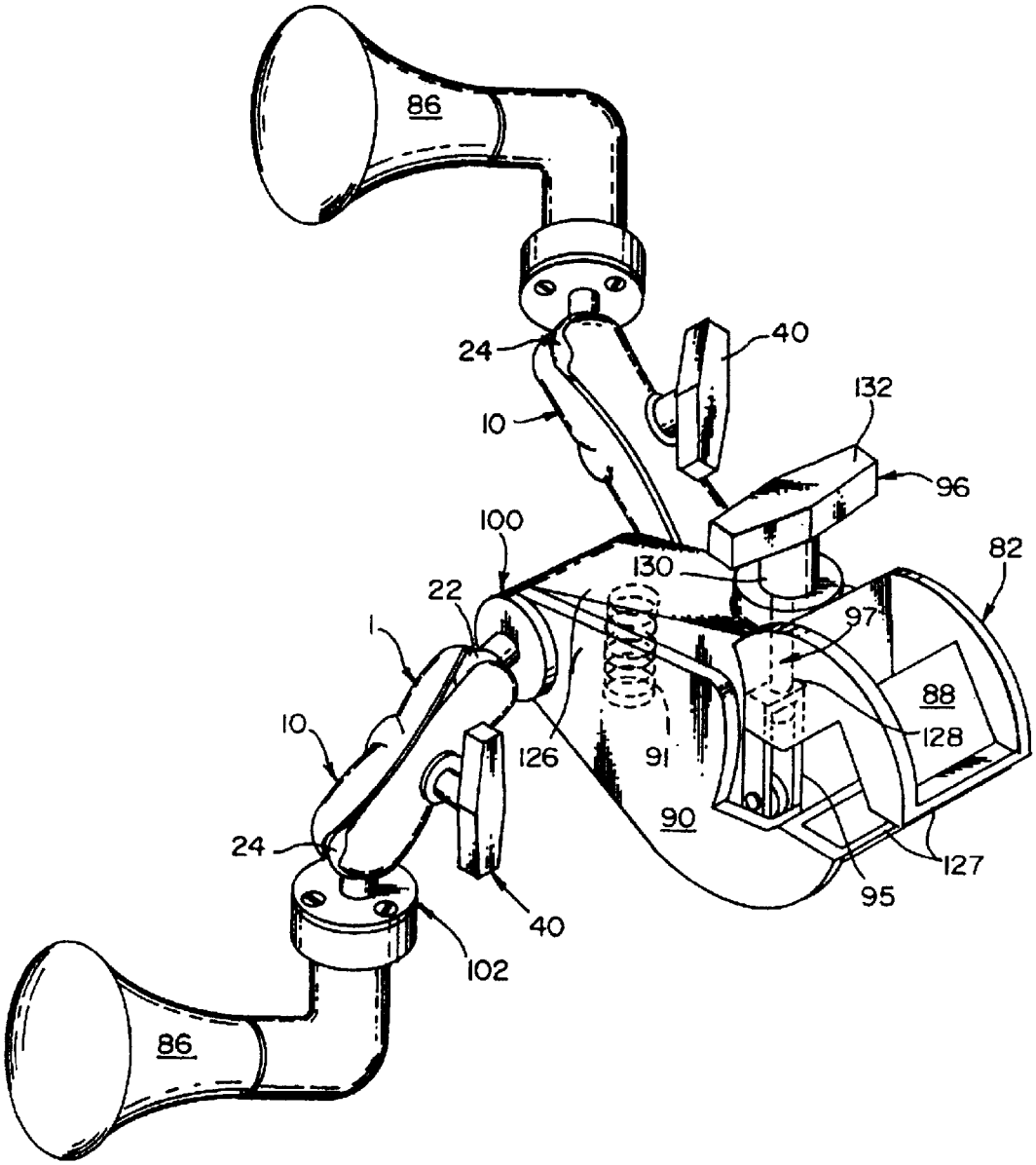
FIG. 8 is a perspective view of a lighting assembly wherein a pair of the mounting devices is employed in mounting a pair of lamps on a clamping device which is adapted to be mounted in turn on a support (not shown) extending relatively crosswise thereof.

FIG. 8 illustrates how a pair of mounting devices 10 can be equipped with a pair of lamps 86 and secured to an intermediate coupling device 82 that is clampable in turn to an elongated support (not shown), such as a stanchion, by way of collectively mounting the pair of lamps on the support. In FIG. 8, the coupling device 82 comprises a pair of jaws 88 and 90 that are pivotally secured to one another by a fastener (not shown) extending through coaxial openings (not shown) in the rear end portions 126 thereof, and that are sized to engage one within the other at the forward end portions 127 thereof. A coiled spring 91 is interposed between the rear end portions 126 of the jaws 88 and 90 to urge the jaws apart, and a fastening device 97 and a clamping mechanism 96 similar to those seen in FIGS. 1–5, are interengaged between the forward end portions 127 of the jaws to hold the jaws together against the bias of the spring 91. The fastening device 97 comprises a threaded fastener 128 which extends through an opening 130 in jaw 88, and is coupled to a U-shaped finger 95 that is secured to the inside of jaw 90. The fastener and finger are accompanied by a knob 132 which is attached to the exposed end of the fastener 128, and is operable to impose an inward force against the jaw 88 to control the opening and closing of the coupling device.

Couplers 100 with which to mount the devices 10, are secured to the coupling device 82 at the opposing sides of the jaw 90, and the lamps 86 are attached in turn to the devices 10 themselves, using additional couplers 102 on the split arm assemblies 1 thereof. In use, each lamp 86 can be oriented at any angular orientation desired, relative to the coupling device 82, and therefore, relative to the support, so as to display the assembly in any manner desired.

There are many other variations and modifications that can be made in and to the invention. There are also many other applications of it. For example, the device may be used as a fishing rod holder that is selectively positionable relative to the side of a vessel to which it is attached; or to provide a camera mount; or to provide a mount with which to hold a circuit board while it is being assembled, soldered or maintenanced.

Sometimes two or more mounting devices may be combined to form a system with which to mount elongated objects such as fishing rods or skis on a wall, ceiling or like structure.

A mounting device with a single ball and socket joint, may be employed in lieu of the described paired arrangement. In such a case, the head 22 or 24 of the same would form a first linkage forming member, and the split arm assembly 1 a second linkage forming member. Likewise, means other than a nut and bolt may be employed as the fastening means, and means other than that shown may be employed as the clamping means. For example, vice-like clamps may be employed.

The arm sections need not be identically shaped. One may be larger than the other, and the second may take the form of a finger which is hingedly secured to the first so as to bear against the head of a coupler that is interposed therebetween. Also, in still other versions of my invention, there may be three or more arm sections that bear against the head of a coupler; and the fastening device and clamping mechanism may comprise a collect or the like which urges the arm sections together against the head of a coupler so as to compress and lock the arm sections onto the coupler.

I claim:

1. A mounting device for interposing along a line of juncture between a pair of relatively movable and relatively stationary objects, to support the relatively movable object on the relatively stationary object at a selected angular orientation of the line of juncture with respect to one of the objects, comprising:

means for forming a first coupling member on a first of the objects and a base on a second of the objects at spaced first and second loci, respectively, adjacent opposite ends of the line of juncture, a split arm assembly comprising a pair of relatively rigid arm sections which are adapted to be operatively juxtaposed to one another along the line of juncture between the spaced loci of the first coupling member and the base, and have pairs of corresponding first and second end portions thereof which are operatively opposed to one another across a plane coincident with the line of juncture, so as to be disposed adjacent the first coupling member and the base, respectively, clamping means for squeezing the pair of arm sections together relatively crosswise the plane of the line of juncture, means for producing a differential in the reaction of the respective pairs of first and second end portions of the arm sections to the squeezing action of the clamping means, so that when squeezed together, the pair of arm sections forms a bifurcated arm assembly that in a first position thereof, has its apex at the first locus of the first coupling member and is loosely engaged about the base at the second end portions thereof, means forming a pair of operatively opposing first sockets in the first end portions of the respective arm sections having substantially smooth part spherical surfaces at the inner peripheries thereof which substantially coincide with a circle of revolution that has its center at the first locus of the first coupling member when the bifurcated arm assembly is engaged in the first position thereof about the first coupling member, the first coupling member having a substantially smooth part spherical surface thereon which forms the outer periphery thereof and substantially coincides with the circle of revolution, so that the pair of first sockets and the first coupling member form a relatively rotatable ball and socket joint in the first position of the bifurcated arm assembly, the clamping means being operable in the first position of the bifurcated arm assembly to squeeze the pair of arm sections further together relatively crosswise the plane of the line of juncture and to a second position of the bifurcated arm assembly in which the inner peripheral surfaces of the first sockets assume a disposition relatively radially within the circle of revolution, and the first coupling member being sufficiently radially compressible at the outer peripheral surface thereof that between the first and second positions of the bifurcated arm assembly, the inner peripheral surfaces of the first sockets can deform the surface of the first coupling member to interlock the bifurcated arm assembly with the first coupling member and vice versa at a selected angular orientation of the line of juncture with respect to the one object, and means for producing a differential in the reaction of the respective pairs of first and second end portions of the arm sections to the further squeezing action of the clamping means, so that when squeezed further together into the second position of the bifurcated arm assembly, the pair of arm sections pivots relatively toward one another about the first coupling member to seize the base and rigidly interconnect the bifurcated arm assembly with the base at the selected angular orientation of the line of juncture with respect to the one object.

2. The mounting device according to claim 1 wherein the clamping means are releasable and when the clamping means are released, the pair of arm sections is reciprocable in relation to one another to a third position of the bifurcated arm assembly in which the pair of arm sections is sufficiently spaced apart about the first locus of the first coupling member that the first coupling member is detachable from the bifurcated arm assembly and vice versa.

3. The mounting device according to claim 2 wherein the base takes the form of a second coupling member having a substantially smooth part spherical outer peripheral surface thereon, the second coupling member is also compressible radially thereof at the outer peripheral surface thereof, and the mounting device further comprises means forming a pair of operatively opposing second sockets in the second end portions of the pair of arm sections which have substantially smooth part spherical surfaces at the inner peripheries thereof that are rotatably engageable with the second coupling member at the outer peripheral surface thereof in the respective positions of the bifurcated arm assembly lying between the third and first positions thereof inclusive, and which progressively seize the second coupling member by compressing and deforming the outer peripheral surface thereof to interlock the bifurcated arm assembly with the second coupling member when the pair of arm sections is squeezed together in the direction of the second position of the bifurcated arm assembly from the first position thereof.

4. The mounting device according to claim 1 wherein the base and arm sections are adapted for rotation of the bifurcated arm assembly about the base and vice versa at the second locus of the base.

5. A mounting device for interposing along a line of juncture between a pair of relatively movable and relatively stationary objects, to support the relatively movable object on the relatively stationary object at a selected angular orientation of the line of juncture with respect to one of the objects, comprising:

means for forming a first coupling member on a first of the objects and a base on a second of the objects at spaced first and second loci, respectively, adjacent opposite ends of the line of juncture, a split arm assembly comprising a pair of elongated relatively rigid arm sections which are operatively juxtaposed to one another along the line of juncture between the spaced first and second loci of the first coupling member and the base, and have pairs of corresponding first and second end portions thereof that are operatively opposed to one another across a plane coincident with the line of juncture, the first coupling member having a body with part spherical surfaces at the outer periphery thereof that are disposed on opposite sides of the plane of the line of juncture to substantially coincide with a first circle of revolution having its center at the first locus of the first coupling member, and also having pressure deformable material therein so that the body of the first coupling member can be squeezed between the surfaces thereof to less than the diameter of the first circle of revolution, means forming a pair of operatively opposing first sockets in the pair of first end portions of the respective arm sections, means for applying initial clamping forces to the pair of arm sections to squeeze the pair of arm sections together relatively crosswise the plane of the line of juncture, means for producing a differential in the reaction of the respective pairs of first and second end portions of the arm sections to the initial clamping forces so that when squeezed together, the pair of arm sections assumes a relatively transversely contracted disposition thereof about the first coupling member and the base in which the pair of first sockets in the pair of first end portions is operatively engaged about the outer peripheral surfaces of the first coupling member in substantial coincidence with the first circle of revolution, but the pair of second end portions is spaced apart from one another about the base to the extent that although the pair of arm sections forms a connection between the first coupling member and the base, the connection allows the pair of arm sections to be squeezed further together about the base, the pair of first sockets being adapted to form a first ball and socket joint with the outer peripheral surfaces of the first coupling member when the pair of arm sections assumes the relatively transversely contracted disposition thereof about the first coupling member and the base, so that the first coupling member and the pair of arm sections can be pivoted in relation to one another at the first joint to position the line of juncture at a selected angular orientation with respect to the one object, means for applying additional clamping forces to the pair of arm sections to squeeze the pair of arm sections further together relatively crosswise the plane of the line of juncture when the pair of arm sections is in the relatively transversely contracted disposition thereof about the first coupling member and the base, and means for producing a differential in the reaction of the respective pairs of first and second end portions of the arm sections to the additional clamping forces so that when squeezed further together in the relatively transversely contracted disposition thereof, the pair of arm sections pivots in relation to one another about the first coupling member to reduce the space between the second end portions of the respective arm sections about the base while the pair of first sockets engages the outer peripheral surfaces of the body of the first coupling member to squeeze the body therebetween and interlock the pair of arm sections with the first coupling member to rigidify the connection between the first coupling member and the base at the selected angular orientation of the line of juncture with respect to the one object.

6. The mounting device according to claim 5 wherein the first coupling member is formed of nitrile rubber material at the surface thereof.

7. The mounting device according to claim 5 wherein the pair of arm sections is adapted to extend rectilinearly between the spaced first and second loci of the first coupling member and the base.

8. The mounting device according to claim 5 wherein the means for forming the first coupling member and the base are elements physically separate and distinct from the objects themselves but attachable thereto.

9. The mounting device according to claim 5 wherein the split arm assembly is physically separate and distinct from the means for forming each of the first coupling member and the base.

10. The mounting device according to claim 5 wherein the split arm assembly is physically separate and distinct from the base.

11. The mounting device according to claim 5 wherein the pressure deformable material is resilient and the means for applying additional clamping forces to the pair of arms sections are releasable relatively crosswise the plane of the line of juncture to restore the first joint so that the pair of arm sections and the first coupling member can be pivoted in relation to one another to position the line of juncture at a different angular orientation with respect to the one object.

12. The mounting device according to claim 5 wherein the base has attachment means thereon for forming the connection between the first coupling member and the base, and the arm sections are operatively juxtaposed about the plane of the line of juncture so that when the pair of arms sections is squeezed together by the initial clamping forces to assume the relatively transversely contracted disposition thereof, the second end portions of the pair of arm sections are reciprocated in relation to one another about the base to first positions thereof in which the pair of second end portions is mutually opposed to one another across the plane and the attachment means form a connection between the first coupling member and the base, but the pair of second end portions is sufficiently spaced apart from one another in the connection that the connection allows the pair of arm sections to be squeezed further together about the base.

13. The mounting device according to claim 12 wherein the attachment means are operatively interposed between the pair of second end portions in the connection but adapted so that the respective second end portions of the arm sections are spaced apart from the attachment means when the second end portions assume the first positions thereof in the relative reciprocation thereof, and the device further comprises means operatively interposed between the attachment means and the respective second end portions to loosely interconnect the attachment means with the pair of second end portions and vice versa when the second end portions assume the first positions thereof in the relative reciprocation thereof.

14. The mounting device according to claim 13 wherein the attachment means include a second coupling member having a body with part spherical surfaces at the outer periphery thereof that are disposed on opposite sides of the plane of the line of juncture to substantially coincide with a second circle of revolution having its center at a point between the first positions of the second end portions of the arm sections in the relative reciprocation thereof, and the device further comprises means forming a pair of operatively opposing second sockets in the pair of second end portions of the respective arm sections, which engage about the outer peripheral surfaces of the second coupling member in a third circle of revolution concentric with the second circle of revolution but having a greater diameter than the second circle of revolution so that when the second end portions of the arm sections assume the first positions thereof in the relative reciprocation thereof, the body of the second coupling member and the respective second end portions of the arm sections are loosely interconnected with one another but spaced apart from one another by the differential between the diameters of the second and third circles of revolution.

15. The mounting device according to claim 14 wherein the body of the second coupling member has pressure deformable material therein so that the body of the second coupling member can be squeezed between the surfaces thereof to less than the diameter of the second circle of revolution, and the arm sections are operatively juxtaposed about the plane of the line of juncture so that when the pair of arm sections is squeezed further together by the additional clamping forces, the second end portions of the pair of arm sections are reciprocated in relation to one another about the base to second positions thereof mutually opposed to one another across the plane of the line of juncture and in which the pair of second sockets forms a second ball and socket joint with the outer peripheral surfaces of the second coupling member, so that the second coupling member and the pair of arm sections can be pivoted in relation to one another at the second joint to also position the line of juncture at a selected angular orientation with respect to the other object if desired, and then to third positions thereof mutually opposed to one another across the plane of the line of juncture in which the pair of second sockets engages the outer peripheral surfaces of the body of the second coupling member to squeeze the body therebetween and interlock the pair of arm sections with the second coupling member to rigidify the connection between the respective first and second coupling members at the selected angular orientation of the line of juncture with respect to each of the objects.

16. The mounting device according to claim 15 wherein the pressure deformable material in the bodies of the respective first and second coupling members is resilient and the means for applying additional clamping forces to the pair of arm sections are releasable relatively crosswise the plane of the line of juncture to restore the first and second joints so that the pair of arm sections can be pivoted in relation to the respective first and second coupling members and vice versa, to position the line of juncture at different angular orientations with respect to the one and/or the other objects.

17. The mounting device according to claim 16 wherein the differential producing means include yieldable biasing means and the space between the first and second loci of the first coupling member and the base respectively is of such length that when the second coupling member is detached from the split arm assembly and vice versa, the pair of arm sections can be pinched together against the bias of the biasing means to separate the pair of first sockets from one another to the extent that the first coupling member can be detached from the pair of arm sections and vice versa.

18. The mounting device according to claim 5 wherein the means for producing a differential in the reaction of the respective pairs of first and second end portions of the arm sections to the initial clamping forces include means operable to generate a lop-sided effect in the application of the initial clamping forces to the respective pairs of first and second end portions of the arm sections when the pair of arm sections is squeezed together to assume the relatively transversely contracted disposition thereof.

19. The mounting device according to claim 5 wherein the base has attachment means thereon for forming the connection between the first coupling member and the base, and the attachment means and the first coupling member have means operatively interposed therebetween to generate a lop-sided effect in the application of the initial clamping forces to the respective pairs of first and second end portions of the arm sections when the pair of arm sections is squeezed together to assume the relatively transversely contracted disposition thereof.

20. The mounting device according to claim 19 wherein the attachment means include a second coupling member having a body with part spherical surfaces at the outer periphery thereof that are disposed on opposite sides of the plane of the line of juncture to substantially coincide with a second circle of revolution having its center at a point interposed between the second end portions of the arm sections when the pair of arm sections is squeezed together to assume the relatively transversely contracted disposition thereof, the first and second circles of revolution have substantially equal diameters, and the means for generating a lop-sided effect in the application of the initial clamping forces to the respective first and second end portions of the arm sections include yieldable biasing means disposed to oppose the application of the initial clamping forces to the second end portions of the respective arm sections.

21. The mounting device according to claim 20 wherein the yieldable biasing means are interposed across the plane of the line of juncture between the first and second coupling members.

22. The mounting device according to claim 21 wherein the initial clamping forces are applied to the pair of arm sections along a line interposed across the plane of the line of juncture between the yieldable biasing means and the first coupling member.

23. The mounting device according to claim 22 wherein the yieldable biasing means take the form of a coiled spring which is caged between the pair of arm sections along a line interposed across the plane of the line of juncture substantially parallel to the line of application of the initial clamping forces.

24. The mounting device according to claim 20 wherein the arm sections are operatively juxtaposed about the plane of the line of juncture so that when the pair of arm sections is squeezed together by the initial clamping forces, the second end portions of the pair of arm sections are reciprocated against the bias of the yieldable biasing means to positions mutually opposed to one another across the plane and in which the second coupling member forms a connection between the first coupling member and the base, but the pair of second end portions is sufficiently spaced apart from one another in the connection that the connection allows the pair of arm sections to be squeezed further together about the base.

25. The mounting device according to claim 20 wherein the space between the first and second loci of the first coupling member and the base respectively, is of such length that when the second coupling member is detached from the split arm assembly and vice versa, the pair of arm sections can be pinched together against the bias of the biasing means to separate the first end portions of the arm sections from one another to the extent that the first coupling member can be detached from the pair of arm sections and vice versa.

26. The mounting device according to claim 5 wherein the pressure deformable material renders the body of the first coupling member radially compressible at the outer peripheral surfaces thereof.

27. The mounting device according to claim 5 wherein the first sockets have surfaces at the inner peripheries thereof which are adapted to form the first ball and socket joist with the outer peripheral surfaces of the first coupling member when the pair of arm sections assumes the relatively transversely contracted disposition thereof about the first coupling member and the base.

28. The mounting device according to claim 27 wherein the pressure deformable material renders the body of the first coupling member radially compressible at the outer peripheral surfaces thereof, and the inner peripheral surfaces of the first sockets are part spherical and adapted to substantially coincide with the first circle of revolution when the pair of arm sections assumes the relatively transversely contracted disposition thereof about the first coupling member and the base so that the first joint is formed between the respective inner and outer peripheral surfaces of the first sockets and the first coupling member, and then to compress the body of the first coupling member radially thereof at the outer peripheral surfaces thereof when the pair of arm sections is squeezed further together in the relatively transversely contracted disposition thereof to interlock the pair of arm sections with the first coupling member and rigidify the connection between the first coupling member and the base at the selected angular orientation of the line of juncture with respect to the one object.

29. The mounting device according to claim 5 wherein the respective means for applying the initial clamping forces and the additional clamping forces to the pair of arm sections include a pin and hole fastening device for fastening the pair of arm sections together relatively crosswise the plane of the line of juncture, and a clamping mechanism on the fastening device for applying clamping forces to the pair of arm section through the fastening device.

30. A mounting device for interposing along a line of juncture between a pair of relatively movable and relatively stationary objects, to support the relatively movable object on the relatively stationary object at varying angular orientations of the line of juncture with respect to one of the objects, comprising:

means for forming a first coupling member on a first of the objects and a base on a second of the objects at spaced first and second loci, respectively, adjacent opposite ends of the line of juncture, a split arm assembly comprising a pair of relatively rigid arm sections which are adapted to be operatively juxtaposed to one another along the line of juncture between the spaced first and second loci of the first coupling member and the base, and have faces thereon which are operatively opposed to one another across a plane coincident with the line of juncture, releasable clamping means for reciprocating the pair of arm sections in relation to one another relatively crosswise the plane of the line of juncture to form the split arm assembly into a bifurcated arm assembly which has its apex at the second locus of the base and is engaged about the first coupling member, means forming a pair of operatively opposing first sockets in the faces of the respective arm sections having substantially smooth part spherical surfaces at the inner peripheries thereof which substantially coincide with a circle of revolution that has its center at the first locus of the first coupling member when the bifurcated arm assembly is engaged in a first position thereof about the first coupling member, the first coupling member having a substantially smooth part spherical surface thereon which forms the outer periphery thereof and substantially coincides with the circle of revolution, so that the pair of first surfaces and the first coupling member form a relatively rotatable ball and socket joint in the first position of the bifurcated arm assembly, the clamping means being operable in the first position of the bifurcated arm assembly to reciprocate the pair of arm sections in relation to one another to a second position of the bifurcated arm assembly in which the first sockets assume a disposition relatively radially within the circle of revolution, and the first coupling member being sufficiently radially compressible at the outer peripheral surface thereof that between the first and second positions of the bifurcated arm assembly, the inner peripheral surfaces of the pair of first sockets can deform the surface of the first coupling member to interlock the bifurcated arm assembly with the first coupling member and vice versa, but the inner peripheral surfaces of the first sockets also being substantially smooth over sufficient arcuate extent circumferentially of the outer peripheral surface of the first coupling member and the first coupling member being sufficiently resilient at the surface thereof, that when the clamping means are released, the pair of first sockets and the first coupling member reform a relatively rotatable ball and socket joint at the first position of the bifurcated arm assembly, so that the bifurcated arm assembly can be rotated about the first coupling member to vary the angular orientation of the line of juncture with respect to the first coupling member, and wherein when the clamping means are released, the pair of arm sections are reciprocable in relation to one another to a third position of the bifurcated arm assembly in which the faces of the pair of arm sections are sufficiently spaced apart about the first locus of the first coupling member that the first coupling member is detachable from the bifurcated arm assembly and vice versa, and the base takes the form of a second coupling member having a substantially smooth part spherical surface thereon which forms the outer periphery thereof, the second coupling member is also compressible radially thereof at the outer peripheral surface thereof, and the mounting device further comprises means forming a pair of operatively opposing second sockets in the faces of the respective arm sections which have substantially smooth part spherical surfaces at the inner peripheries thereof that are rotatably engageable with the second coupling member at the outer peripheral surface thereof in the respective positions of the bifurcated arm assembly lying between the third and first positions thereof inclusive, and which progressively seize the second coupling member by compressing and deforming the surface thereof to interlock the bifurcated arm assembly with the second coupling member when the pair of arm sections are reciprocated in relation to one another in the direction of the second position of the bifurcated arm assembly from the first position thereof.

31. The mounting device according to claim 30 wherein the releasable clamping means include yieldable biasing means operable to space the pair of arm sections from one another at the faces thereof relatively crosswise the plane of the line of juncture, and a releasable clamping mechanism operable against the bias of the yieldable biasing means to reciprocate the pair of arm sections relatively toward one another at the faces of the arm sections, the yieldable biasing means and the clamping mechanism being engaged with the pair of arm sections in the space between the first and second loci of the first coupling member and the base, respectively, to form the split arm assembly into a bifurcated arm assembly which has its apex at the second locus of the base when the pair of arm sections is reciprocated relatively toward one another at the faces thereof.

32. The mounting device according to claim 31 wherein the faces of the respective arm sections have recesses therein between the first and second loci of the first coupling member and the base, and the yieldable biasing means take the form of a coiled spring which is caged between the respective arm sections at the recesses in the faces thereof.

33. The mounting device according to claim 32 wherein the space between the first and second loci of the first and second coupling members is of such length that when the first coupling member is detached from the bifurcated arm assembly and vice versa, the arm sections can be pinched together against the bias of the spring to separate the pair of second sockets from one another to the extent that the second coupling member can be detached from the pair of arm sections and vice versa.

34. The mounting device according to claim 32 wherein the arm sections have a pair of mutually opposing openings therein at the bottoms of the recesses, and the clamping mechanism takes the form of an elongated bolt which is passed through the pair of openings and has a flange on one end portion thereof and threading on the other end portion thereof, and a knob which is threadedly engaged with the threading on the other end portion of the bolt and cooperable with the flange on the bolt to clamp the pair of arm sections therebetween.

35. A mounting device for interposing along a line of juncture between a pair of relatively movable and relatively stationary objects, to support the relatively movable object on the relatively stationary object at varying angular orientations of the line of juncture with respect to one of the objects, comprising:

means for forming a first coupling member on a first of the objects and a base on a second of the objects at spaced first and second loci, respectively adjacent opposite ends of the line of juncture, a split arm assembly comprising a pair of relatively rigid arm sections which are adapted to be operatively juxtaposed to one another along the line of juncture between the spaced first and second loci of the first coupling member and the base, and have faces thereon which are operatively opposed to one another across a plane coincident with the line of juncture, releasable clamping means for reciprocating the pair of arm sections in relation to one another relatively crosswise the plane of the line of juncture to form the split arm assembly into a bifurcated arm assembly which has its apex at the second locus of the base and is engaged about the first coupling member, means forming a pair of operatively opposing first sockets in the faces of the respective arm sections having substantially smooth part spherical surfaces at the inner peripheries thereof which substantially coincide with a circle of revolution that has its center at the first locus of the first coupling member when the bifurcated arm assembly is engaged in a first position thereof about the first coupling member, the first coupling member having a substantially smooth part spherical surface thereon which forms the outer periphery thereof and substantially coincides with the circle of revolution, so that the pair of first sockets and the first coupling member form a relatively rotatable ball and socket joint in the first position of the bifurcated arm assembly, the clamping means being operable in the first position of the bifurcated arm assembly to reciprocate the pair of arm sections in relation to one another to a second position of the bifurcated arm assembly in which the first sockets assume a disposition relatively radially within the circle of revolution, and the first coupling member being sufficiently radially compressible at the outer peripheral surface thereof that between the first and second positions of the bifurcated arm assembly, the inner peripheral surfaces of the pair of first sockets can deform the surface of the first coupling member to interlock the bifurcated arm assembly with the first coupling member and vice versa, but the inner peripheral surfaces of the first sockets also being substantially smooth over sufficient arcuate extent circumferentially of the outer peripheral surface of the first coupling member and the first coupling member being sufficiently resilient at the surface thereof, that when the clamping means are released, the pair of first sockets and the first coupling member reform a relatively rotatable ball and socket joint at the first position of the bifurcated arm assembly, so that the bifurcated arm assembly can be rotated about the first coupling member to vary the angular orientation of the line of juncture with respect to the first coupling member, and the first coupling member having a reduced diameter neck at a side thereof opposed to the part spherical outer peripheral surface thereof, and the first sockets having rims formed thereabout in the faces of the respective arm sections, and indentations in the respective rims thereof at the plane of the line of juncture, which together are greater in width than the neck so that the bifurcated arm assembly can be rotated about the locus of the first coupling member to angular orientations in which the line of juncture extends at right angles to the neck of the first coupling member.

36. The mounting device according to claim 35 wherein the respective arm sections have ends adjacent the first sockets, and the first sockets also have indentations in the respective rims thereof at the adjacent ends of the arm sections, which together are greater in width than the neck so that the bifurcated arm assembly can be rotated about the first locus of the first coupling member to angular orientations in which the plane of the line of juncture extends at oblique angles to the first coupling member.

37. A mounting device for interposing along a line of juncture between a pair of relatively movable and relatively stationary objects, to support the relatively movable object on the relatively stationary object at varying angular orientations of the line of juncture with respect to one of the objects, comprising:

means for forming a first coupling member on a first of the objects and a base on a second of the objects at spaced first and second loci, respectively, adjacent opposite ends of the line of juncture, a split arm assembly comprising a pair of relatively rigid arm sections which are adapted to be operatively juxtaposed to one another along the line of juncture between the spaced first and second loci of the first coupling member and the base, and have faces thereon which are operatively opposed to one another across a plane coincident with the line of juncture, releasable clamping means for reciprocating the pair of arm sections in relation to one another relatively crosswise the plane of the line of juncture to form the split arm assembly into a bifurcated arm assembly which has its apex at the second locus of the base and is engaged about the first coupling member, means forming a pair of operatively opposing first sockets in the faces of the respective arm sections having substantially smooth part spherical surfaces at the inner peripheries thereof which substantially coincide with a circle of revolution that has its center at the first locus of the first coupling member when the bifurcated arm assembly is engaged in a first position thereof about the first coupling member, the first coupling member having a substantially smooth part spherical surface thereon which forms the outer periphery thereof and substantially coincides with the circle of revolution, so that the pair of first sockets and the first coupling member form a relatively rotatable ball and socket joint in the first position of the bifurcated arm assembly, the clamping means being operable in the first position of the bifurcated arm assembly to reciprocate the pair of arm sections in relation to one another to a second position of the bifurcated arm assembly in which the first sockets assume a disposition relatively radially within the circle of revolution, and the first coupling member being sufficiently radially compressible at the outer peripheral surface thereof that between the first and second positions of the bifurcated arm assembly, the inner peripheral surfaces of the pair of first sockets can deform the surface of the first coupling member to interlock the bifurcated arm assembly with the first coupling member and vice versa, but the inner peripheral surfaces of the first sockets also being substantially smooth over sufficient arcuate extent circumferentially of the outer peripheral surface of the first coupling member and the first coupling member being sufficiently resilient at the surface thereof, that when the clamping means are released, the pair of first sockets and the first coupling member reform a relatively rotatable ball and socket joint at the first position of the bifurcated arm assembly, so that the bifurcated arm assembly can be rotated about the first coupling member to vary the angular orientation of the line of juncture with respect to the first coupling member, and the first sockets having rims formed thereabout at the fares of the respective arm sections and cruciate grooves at the inner peripheries thereof subdividing the part spherical surfaces thereof into four relatively smaller part spherical surfaces apiece, each of which terminates at the groove in the respective first socket and the rim thereabout.

*38. An interlocking ball and socket joint comprising:*

*a coupling member partially formed of a resilient deformable material comprising a substantially smooth, part spherical outer peripheral surface, the coupling member having a reduced diameter neck at a side thereof opposed to the part spherical outer peripheral surface thereof, the neck extending beyond the resilient deformable material;*

*a pair of sockets formed from respective bifurcated arm sections and having opposing interior surfaces shaped to substantially conform to the substantially smooth, part spherical, outer peripheral surface of the resilient deformable material of the coupling member, the sockets having rims formed thereabout in faces of the respective arm sections and indentations in the respective rims thereof at a plane of a line of juncture corresponding to a longitudinal axis between the sockets which indentations are greater in width than the neck so that the arm sections can be rotated about a locus of the coupling member to angular orientations in which the line of juncture extends at right angles to the neck of the coupling member; and*

*an adjustable clamp configured and arranged to provide a plurality of different adjustment relationships to the opposing interior surfaces,*

*one adjustment of the clamp conforming the opposing interior surfaces in a relatively rotational relationship with the coupling member, and*

*another adjustment of the clamp conforming the opposing interior surfaces in an interlocking relationship with the coupling member, wherein the opposing interior surfaces radially compress and deform at least a portion of the resilient deformable material of the coupling member.*

*39. The interlocking ball and socket joint of claim 38, wherein each of the opposing interior surfaces comprises substantially smooth concave surfaces.*

*40. An interlocking ball and socket joint comprising:*

*a base that takes the form of a coupling member having a substantially smooth part spherical surface thereon which forms an outer periphery thereof, the coupling member is also compressible radially thereof at the outer peripheral surface thereof and has a projection extending therefrom;*

*a socket arrangement comprising means forming a pair of operatively opposing sockets in faces of respective*

*bifurcated arm sections which have substantially smooth part spherical surfaces at inner peripheries thereof, the socket having rims and indentations in the rims which are greater in width than the projection so that the projection can be rotated to positions within the indentations; and*

*an adjustable clamp mechanically attached to the socket members and configured and arranged for positioning the socket members in a plurality of opposing relationships to one another,*

*wherein the pair of sockets are rotatably engageable with the coupling member at the outer peripheral surface thereof in the respective positions of the arm sections lying between third and first positions thereof inclusive, and which progressively seize the coupling member by compressing and deforming the surface thereof to interlock the arm sections with the coupling member when the arm sections are reciprocated in relation to one another in the direction of a second position from the first position thereof.*

*41. The interlocking ball and socket joint of claim 40, wherein a radially compressible material of the coupling member is rotationally fixed to the projection.*

*42. A method of forming a universally positionable device for fixing relative angular orientation between a ball and a socket, the method comprising:*

*fixing a substantially smooth globular structure of compressible material onto a reduced diameter neck extending beyond the compressible material to form a coupling member;*

*disposing two opposing sockets about the globular structure, each socket corresponding to a respective one of two bifurcated arm sections, the two opposing sockets adapted for disposing in a first relatively rotational relationship thereto and a second angularly fixed relationship thereto, wherein the coupling member has the reduced diameter neck at a side thereof opposed to a part spherical outer peripheral surface thereof, and the two opposing sockets have rims formed thereabout in the faces of the respective arm sections, and indentations in the respective rims thereof at a plane of a line of juncture between the two opposing sockets, which indentations are greater in width than the neck so that the arm sections can be rotated about a locus of the coupling member to angular orientations in which the line of juncture extends at right angles to the neck of the coupling member; and*

*compressing a first portion of the compressible material between the two opposing sockets.*

*43. The method of claim of claim 42, wherein disposing two opposing socket surfaces about the globular structure further comprises disposing two opposing substantially smooth concave interior socket surfaces about the globular structure.*

*44. The method of claim of claim 42, further comprising:*

*fixing a second substantially smooth globular structure of compressible material onto a neck extending beyond the compressible material;*

*disposing two opposing second sockets about the second globular structure, the second two opposing second sockets being adapted for disposing in a first relatively rotational relationship thereto and a second angularly fixed relationship thereto; and*

*compressing a first portion of the compressible material of the second globular structure between the two opposing second sockets.*

*45. The method of claim of claim 42, wherein:*

*disposing two opposing sockets about the globular structure further comprises forming a relief within an interior surface of at least one of the two opposing sockets; and*

*compressing a first portion of the compressible material between the two opposing sockets further comprises simultaneously expanding into the relief a portion of the compressible material.*

*46. An interlocking ball and socket joint comprising:*

*a base that takes the form of a coupling member having a substantially smooth part spherical surface thereon which forms the outer periphery thereof, the coupling member is also compressible radially thereof at the outer peripheral surface thereof, wherein the coupling member comprises a radially compressible material having a projection extending outside of the radially compressible material,*

*a socket arrangement comprising means forming a pair of operatively opposing sockets in faces of respective bifurcated arm sections which have substantially smooth part spherical surfaces at inner peripheries thereof, the sockets having rims and indentations in the rims which are greater in width than the projection so that the projection can be rotated to positions within the indentations; and*

*an adjustable clamp mechanically attached to the sockets configured and arranged for positioning the socket members in a plurality of opposing relationships to one another,*

*wherein the pair of sockets are rotatably engageable with the coupling member at the outer peripheral surface thereof in the respective positions of the arm sections lying between third and first positions thereof inclusive, and which progressively seize the coupling member by compressing and deforming the surface thereof to interlock the arm sections with the second coupling member when the arm sections are reciprocated in relation to one another in the direction of a second position from the first position thereof.*

*47. The interlocking ball and socket joint of claim 46, wherein the substantially smooth part spherical surfaces of at least one of the pair of sockets further comprises a relief formed therein.*

*48. A mounting device, comprising:*

*a first coupling member comprising a part spherical head and a neck extending from the head, the head comprising a substantially smooth outer surface of resilient deformable material;*

*a base that takes the form of a second coupling member, the second coupling member comprising a part spherical head and a neck extending from the head, the head comprising a substantially smooth, part spherical outer surface thereon which forms an outer periphery thereof and is formed of resilient, compressible, deformable material, wherein the second coupling member is also compressible radially thereof at the outer peripheral surface thereof;*

*a plurality of bifurcated arm sections forming first sockets at end portions of the respective arm sections and comprising means forming at least a pair of operatively opposed second sockets in faces of the respective arm sections, the first and second sockets having substantially smooth, part spherical surfaces at inner peripheries thereof; and*

*an adjustable clamp coupled to the arm sections, the adjustable clamp being configured and arranged to provide a plurality of positions,*

*wherein the first sockets and first coupling member are rotatably engageable and the second sockets are rotatably engageable with the second coupling member at the outer peripheral surface thereof in the respective positions of the adjustable clamp and the arm sections lying between a third position and a first position thereof inclusive, and*

*wherein the second sockets progressively seize the second coupling member by compressing and deforming the surface thereof to interlock the arm sections with the second coupling member when the arm sections are reciprocated in relation to one another in the direction of a second position of the adjustable clamp and the arm sections from the first position thereof.*

*49. The mounting device of claim 48, wherein the arm sections are not all identically shaped.*

*50. The mounting device of claim 48, wherein the first sockets are two opposing first sockets.*

*51. The mounting device of claim 50, wherein the first coupling member comprises a disc-shaped base coupled to the neck.*

*52. The mounting device of claim 51, wherein the disc-shaped base of the first coupling member defines three openings in the base forming an equilateral triangle.*

*53. The mounting device of claim 52, wherein the second coupling member comprises a disc-shaped base coupled to the neck and the disc-shaped base of the second coupling member defines three openings in the base forming an equilateral triangle.*

*54. The mounting device of claim 53, wherein the resilient deformable material of the first coupling member is an elastomeric material.*

*55. The mounting device of claim 48, wherein a first one of the arm sections is smaller than a second one of the arm sections and wherein the first one and the second one of the arm sections form the first sockets.*

*56. The mounting device of claim 55, wherein the first one of the arm sections is hingedly secured to the second one of the arm sections.*

*57. The mounting device of claim 48, wherein the mounting device comprises at least three arm sections.*

*58. The mounting device of claim 48, wherein the resilient deformable material of the first coupling member is an elastomeric material.*

*59. The mounting device of claim 58, wherein the elastomeric material comprises nitrile rubber.*

*60. The mounting device of claim 48, wherein the head of the first coupling member has a Shore A durometer of between 30–100.*

*61. The mounting device of claim 48, wherein the head of the first coupling member has a Shore D hardness of between 40 and 70.*

*62. The mounting device of claim 48, wherein the first coupling member comprises a disc-shaped base coupled to the neck.*

*63. The mounting device of claim 62, wherein the disc-shaped base of the first coupling member defines three openings in the base forming an equilateral triangle.*

*64. The mounting device of claim 63, wherein the second coupling member comprises a disc-shaped base coupled to the neck and the disc-shaped base of the second coupling member defines three openings in the base forming an equilateral triangle.*

* * * * *